(12) United States Patent
Zhang et al.

(10) Patent No.: US 10,608,693 B2
(45) Date of Patent: Mar. 31, 2020

(54) BASE STATION, SMALL CELL, AND CONTROL CHANNEL CONFIGURATION METHOD

(71) Applicant: Huawei Technologies Co., Ltd., Shenzhen, Guangdong (CN)

(72) Inventors: Lili Zhang, Beijing (CN); Richard Stirling-Gallacher, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/571,579

(22) PCT Filed: May 5, 2015

(86) PCT No.: PCT/CN2015/078277
§ 371 (c)(1),
(2) Date: Nov. 3, 2017

(87) PCT Pub. No.: WO2016/176825
PCT Pub. Date: Nov. 10, 2016

(65) Prior Publication Data
US 2018/0159584 A1     Jun. 7, 2018

(51) Int. Cl.
*H04B 1/525*     (2015.01)
*H04L 5/00*     (2006.01)
(Continued)

(52) U.S. Cl.
CPC ........... *H04B 1/525* (2013.01); *H04B 1/7097* (2013.01); *H04L 5/0044* (2013.01);
(Continued)

(58) Field of Classification Search
CPC ............... H04B 1/525; H04B 7/15542; H04B 7/15585; H04B 17/11; H04B 17/345; H04B 1/7097; H04B 7/00; H04B 7/15
(Continued)

(56) References Cited

U.S. PATENT DOCUMENTS 9,172,495 B1 * 10/2015 Shah ................. H04L 1/0005
2013/0034043 A1   2/2013 Yu et al.
(Continued)

FOREIGN PATENT DOCUMENTS

CN     101873630 A    12/2010
CN     103024749 A     4/2013
(Continued)

OTHER PUBLICATIONS

Email discussion moderator, "Summary of Relay email discussion [59-12-LTE-A]: Others," R1-100381, 3GPP TSG RAN WG1 Meeting #59bis, Valencia, Spain, Jan. 18-22, 2010, 8 pages.
(Continued)

*Primary Examiner* — Ajibola A Akinyemi
(74) *Attorney, Agent, or Firm* — Kilpatrick Townsend & Stockton LLP

(57) ABSTRACT

The present invention relates to a base station, a small cell, and a control channel configuration method to resolve resource waste caused when an additional physical control channel is used on a backhaul link of a small cell to transmit control information. In a base station provided by an embodiment of the present invention, a transceiver module is configured to receive full-duplex capability support information transmitted by a small cell, where the full-duplex capability support information is used to indicate whether the small cell supports use of a same physical layer resource for simultaneous reception on a backhaul link and transmission on an access link; and a processing module is configured to determine a configuration mode of the backhaul link between the base station and the small cell and the access link of the small cell according to the full-duplex capability support information received by the transceiver module.

8 Claims, 10 Drawing Sheets

```
                                              ┌── S1201
┌─────────────────────────────────────────────────────┐
│ A small cell determines full-duplex capability support information of the small │
│ cell, where the full-duplex capability support information is used to indicate │
│ whether the small cell supports use of a same physical layer resource for │
│ simultaneous reception on a backhaul link and transmission on an access link │
└─────────────────────────────────────────────────────┘
                             │
                             │                ┌── S1202
                             ▼
┌─────────────────────────────────────────────────────┐
│     The small cell transmits the determined full-duplex capability support │
│     information to a base station to instruct the base station to determine a │
│  configuration mode of the backhaul link between the base station and the small │
│  cell and the access link of the small cell according to the full-duplex capability │
│                         support information │
└─────────────────────────────────────────────────────┘
```

(51) Int. Cl.
*H04L 5/14* (2006.01)
*H04B 1/7097* (2011.01)
*H04W 28/02* (2009.01)
*H04W 28/26* (2009.01)
*H04W 72/08* (2009.01)
*H04W 16/32* (2009.01)

(52) U.S. Cl.
CPC .......... *H04L 5/0073* (2013.01); *H04L 5/0082* (2013.01); *H04L 5/14* (2013.01); *H04W 28/0236* (2013.01); *H04W 28/26* (2013.01); *H04W 72/082* (2013.01); *H04L 5/0007* (2013.01); *H04W 16/32* (2013.01)

(58) Field of Classification Search
USPC .......................................................... 455/78
See application file for complete search history.

(56) References Cited

U.S. PATENT DOCUMENTS

| | | | |
|---|---|---|---|
| 2014/0078939 A1 | 3/2014 | Shirani-Mehr et al. | |
| 2014/0177519 A1 | 6/2014 | Bhattad et al. | |
| 2014/0206374 A1 | 7/2014 | Luo et al. | |
| 2014/0301370 A1* | 10/2014 | Sivavakeesar | H04B 7/15 370/331 |
| 2015/0092695 A1 | 4/2015 | Zhao et al. | |
| 2016/0198475 A1* | 7/2016 | Uchiyama | H04W 52/38 370/329 |
| 2016/0374063 A1 | 12/2016 | Horiuchi et al. | |

FOREIGN PATENT DOCUMENTS

| | | |
|---|---|---|
| CN | 103283196 A | 9/2013 |
| CN | 103874045 A | 6/2014 |
| CN | 103875297 A | 6/2014 |
| CN | 104254077 A | 12/2014 |
| EP | 3001579 B1 | 8/2017 |
| WO | 2011160253 A1 | 12/2011 |
| WO | 2013121727 A1 | 8/2013 |
| WO | 2013142361 A1 | 9/2013 |
| WO | 2013159676 A1 | 10/2013 |
| WO | 2014206338 A1 | 12/2014 |
| WO | 2015045555 A1 | 4/2015 |

OTHER PUBLICATIONS

3GPP TR 36.912 V12.0.0 (Sep. 2014), 3rd Generation Partnership Project; Technical Specification Group Radio Access Network; Feasibility study for Further Advancements for E-UTRA (LTE-Advanced) (Release 12), Sep. 2014, total 62 pages.

Mayank Jain, et al.,"Practical, Real-time, Full Duplex Wireless," MobiCom '11, Sep. 19-23, 2011, total 12 pages.

Jung Il Choi, et al.,"Achieving Single Channel, Full Duplex Wireless Communication," Mobicom '10, 2010, total 12 pages.

Bozidar Radunovic, et al., "Rethinking Indoor Wireless Mesh Design: Low Power, Low Frequency, Full-Duplex," Wireless Mesh Networks, 2010, total 6 pages.

Evan Everett, et al.,"Empowering Full-Duplex Wireless Communication by Exploiting Directional Diversity," Asilomar 2011, 2011, total 3 pages.

Achaleshwar Sahai, et al., "Pushing the limits of Full-duplex: Design and Real-time Implementation," Rice University Technical Report TREE 1104, Jul. 4, 2011, total 12 pages.

3GPP TR 36.912 V10.0.0 (Mar. 2011), 3rd Generation Partnership Project; Technical Specification Group Radio Access Network; Feasibility study for Further Advancements for E-UTRA (LTE-Advanced) (Release 10), Mar. 2011, total 62 pages.

Kari Rikkinen (UOULU), et al.,"Full-Duplex Radios for Local Access, final report," DUPLO Deliverable D6.3, May 31, 2015, total 76 pages.

\* cited by examiner

BASE STATION, SMALL CELL, AND CONTROL CHANNEL CONFIGURATION METHOD

CROSS-REFERENCE TO RELATED APPLICATIONS

This application is a national stage of International Application No. PCT/CN2015/078277, filed on May 5, 2015, which is hereby incorporated by reference in its entirety.

TECHNICAL FIELD

The present invention relates to wireless communications technologies, and in particular, to a base station, a small cell, and a control channel configuration method.

BACKGROUND

On one hand, to extend coverage of a base station and improve a coverage effect of the base station, or due to other reasons, a small cell such as a relay node cell (relay cell), a pico base station cell (pico cell), a home NodeB cell (a femto cell or a Home eNodeB), or the like is introduced in a communications system. As shown in FIG. 1, on one hand, the small cell performs data transmission with a base station such as an access point (access point) by using a backhaul link (backhaul link), and on the other hand, performs data transmission with a wireless terminal (for example, a user terminal (User Equipment, UE)) by using an access link (access link). In this way, communication between the base station and the wireless terminal is implemented by using a relay node, and coverage of the base station is extended.

The base station and the small cell may be connected in a wireless or wired mode (for example, by using an optical fiber). FIG. 1 shows that the base station and the small cell are connected in the wireless mode.

On the other hand, it is theoretically feasible that a wireless communications device performs transmission and reception simultaneously on a same carrier. However, a signal transmitted on a transmit link by the wireless communications device is always leaked to a receive link of the wireless communications device, and causes interference to the receive link. Therefore, in an implementation, the wireless communications device is not allowed to perform transmission and reception simultaneously on the same carrier.

Herein, simultaneous transmission and reception on the same carrier are referred to as "full-duplex". A potential full-duplex application includes: a small cell receives a signal from a base station, and simultaneously transmits a signal to a nearby wireless terminal by using a same physical layer resource, for example, a same carrier.

Currently, considering the foregoing problem of interference from the transmit link to the receive link, generally, full-duplex communication on the same subcarrier is generally not implemented in the wireless communications system.

For example, the 3rd Generation Partnership Project (the $3^{rd}$ Generation Partner Project, 3GPP) release 10 (release 10) specifies that a wireless communications device cannot perform transmission and reception simultaneously on a same time-frequency resource, namely, a physical layer resource. In the release 10, information on a control channel is transmitted on a backhaul link between a base station and a relay node through a relay-physical downlink control channel (Relay-Physical Downlink Control Channel, R-PDCCH).

In a wireless communications system specified in the 3GPP release 10, because an R-PDCCH occupies a time-frequency resource of a physical downlink shared channel (Physical Downlink Shared Channel, PDSCH) of a base station, but a time-frequency resource of a conventional physical downlink control channel (Physical Downlink Control Channel, PDCCH) is vacant and unused, resource waste is caused.

In conclusion, in the current wireless communications system, to avoid interference caused by a backhaul link of a small cell such as a relay node, an additional physical control channel needs to be used on the backhaul link to transmit control information, and therefore, resource waste is caused.

SUMMARY

Embodiments of the present invention provide a base station, a small cell, and a control channel configuration method to resolve a problem of resource waste caused when an additional physical control channel is used on a backhaul link of a small cell to transmit control information.

According to a first aspect, an embodiment of the present invention provides a base station, including:

a transceiver module, configured to receive full-duplex capability support information transmitted by a small cell that communicates with the base station, where the full-duplex capability support information is used to indicate whether the small cell supports use of a same physical layer resource for simultaneous reception on a backhaul link and transmission on an access link; and a processing module, configured to determine a configuration mode of the backhaul link between the base station and the small cell and the access link of the small cell according to the full-duplex capability support information received by the transceiver module, where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

With reference to the first aspect, in a first possible implementation, the processing module is specifically configured to:

determine the configuration mode of the backhaul link between the base station and the small cell and the access link of the small cell according to the full-duplex capability support information received by the transceiver module and at least one of the following factors:

usage of physical layer resources on the backhaul link between the base station and the small cell, detected by the processing module;

whether the transceiver module receives a first event transmitted by the small cell, where the first event is used to indicate that a self-interference cancellation gain of the small cell is greater than a preset self-interference cancellation gain threshold; or usage information of the small cell.

With reference to the first possible implementation of the first aspect, in a second possible implementation, the processing module is specifically configured to:

when the full-duplex capability support information received by the transceiver module indicates that the small cell supports use of the same physical layer resource for simultaneous reception on the backhaul link and transmission on the access link, and the processing module detects that on the backhaul link between the base station and the small cell, physical layer resources used for downlink data transmission are insufficient, determine that the configuration mode is the second mode or the third mode.

With reference to the second possible implementation of the first aspect, in a third possible implementation, the processing module is specifically configured to:

when the full-duplex capability support information received by the transceiver module indicates that the small cell supports use of the same physical layer resource for simultaneous reception on the backhaul link and transmission on the access link, and the processing module detects that on the backhaul link between the base station and the small cell, the physical layer resources used for downlink data transmission are insufficient, but detects that on the backhaul link between the base station and the small cell, physical layer resources used for downlink physical layer signaling transmission are sufficient, determine that the configuration mode is the second mode; or when the full-duplex capability support information received by the transceiver module indicates that the small cell supports use of the same physical layer resource for simultaneous reception on the backhaul link and transmission on the access link, and the processing module detects that on the backhaul link between the base station and the small cell, both the physical layer resources used for downlink data transmission and those used for downlink physical layer signaling transmission are insufficient, determine that the configuration mode is the third mode.

With reference to the first possible implementation of the first aspect, in a fourth possible implementation, the processing module is specifically configured to:

when the full-duplex capability support information received by the transceiver module indicates that the small cell supports use of the same physical layer resource for simultaneous reception on the backhaul link and transmission on the access link, and the first event transmitted by the small cell is received, determine that the configuration mode is the second mode or the third mode.

With reference to the fourth possible implementation of the first aspect, in a fifth possible implementation, the processing module is specifically configured to:

when the full-duplex capability support information received by the transceiver module indicates that the small cell supports use of the same physical layer resource for simultaneous reception on the backhaul link and transmission on the access link, and the first event transmitted by the small cell is received, and the processing module detects that on the backhaul link between the base station and the small cell, physical layer resources of a downlink physical channel used for downlink physical layer signaling transmission are sufficient, determine that the configuration mode is the second mode; or when the full-duplex capability support information received by the receiving module indicates that the small cell supports use of the same physical layer resource for simultaneous reception on the backhaul link and transmission on the access link, and the first event transmitted by the small cell is received, and the processing module detects that on the backhaul link between the base station and the small cell, physical layer resources used for downlink physical layer signaling transmission are insufficient, determine that the configuration mode is the third mode.

With reference to any one of the first to the fifth possible implementations of the first aspect, in a sixth possible implementation, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

With reference to any one of the first aspect, or the first to the sixth possible implementations of the first aspect, in a seventh possible implementation, the processing module is specifically configured to:

when the full-duplex capability support information received by the transceiver module indicates that the small cell does not support use of the same physical layer resource for simultaneous reception on the backhaul link and transmission on the access link, determine that the configuration mode is the first mode.

With reference to any one of the first aspect, or the first to the seventh possible implementations of the first aspect, in an eighth possible implementation, the processing module is further configured to:

after determining, according to the full-duplex capability support information received by the transceiver module, the configuration mode of the backhaul link between the base station and the small cell and the access link of the small cell, transmit a mode configuration command to the small cell by using the transceiver module, where the mode configuration command is used to configure the configuration mode of the backhaul link between the base station and the small cell and the access link of the small cell as the determined configuration mode.

With reference to the eighth possible implementation of the first aspect, in a ninth possible implementation, the mode configuration command is transmitted by using a radio resource control RRC message, medium access control MAC signaling, or downlink physical layer signaling.

With reference to the eighth or the ninth possible implementation of the first aspect, in a tenth possible implementation, the mode configuration command further includes subframe configuration information of the backhaul link between the base station and the small cell and the access link of the small cell; or the mode configuration command is further used to instruct the small cell to use preset subframe configuration information as subframe configuration information of the backhaul link between the base station and the small cell and the access link of the small cell.

With reference to the tenth possible implementation of the first aspect, in an eleventh possible implementation, a wireless communications system in which the small cell and the base station are located is a Long Term Evolution LTE system;

the first downlink physical channel is a relay-physical downlink control channel R-PDCCH and/or an enhanced physical downlink control channel E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

With reference to the eleventh possible implementation of the first aspect, in a twelfth possible implementation, if the configuration mode determined by the processing module is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

With reference to the eleventh possible implementation of the first aspect, in a thirteenth possible implementation, if the configuration mode determined by the processing module is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

With reference to the eleventh possible implementation of the first aspect, in a fourteenth possible implementation, if the configuration mode determined by the base station is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

With reference to any one of the eighth to the fourteenth possible implementations of the first aspect, in a fifteenth possible implementation, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes.

With reference to any one of the first aspect, or the first to the fifteenth possible implementations of the first aspect, in a sixteenth possible implementation, the processing module is specifically configured to:

periodically determine the configuration mode of the backhaul link between the base station and the small cell and the access link of the small cell; or when a waiting delay of data transmitted by the transceiver module to the small cell is greater than a preset waiting delay threshold, determine the configuration mode of the backhaul link between the base station and the small cell and the access link of the small cell.

With reference to any one of the first aspect, or the first to the sixteenth possible implementations of the first aspect, in a seventeenth possible implementation, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

According to a second aspect, an embodiment of the present invention provides a small cell, including:

a processing module, configured to determine full-duplex capability support information of the small cell, where the full-duplex capability support information is used to indicate whether the small cell supports use of a same physical layer resource for simultaneous reception on a backhaul link and transmission on an access link; and a transceiver module, configured to transmit the determined full-duplex capability support information to a base station to instruct the base station to determine a configuration mode of the backhaul link between the base station and the small cell and the access link of the small cell according to the full-duplex capability support information; where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

With reference to the second aspect, in a first possible implementation, the transceiver module is further configured to: after transmitting the determined full-duplex capability support information to the base station, receive a mode configuration command transmitted by the base station, where the mode configuration command is used to indicate the configuration mode of the backhaul link between the base station and the small cell and the access link of the small cell; and the processing module is further configured to configure the configuration mode of the backhaul link between the base station and the small cell and the access link of the small cell according to the mode configuration command received by the transceiver module.

With reference to the first possible implementation of the second aspect, in a second possible implementation, before receiving the mode configuration command transmitted by the base station, the transceiver module is further configured to:

when a self-interference cancellation gain of the small cell is greater than a preset self-interference cancellation gain threshold, transmit a first event to the base station, and/or transmit usage information of the small cell to the base station, to instruct the base station to determine the configuration mode of the backhaul link between the base station and the small cell and the access link of the small cell according to the full-duplex capability support information and at least one of the following factors:

whether the base station receives the first event; or the usage information of the small cell.

With reference to the second possible implementation of the second aspect, in a third possible implementation, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

With reference to any one of the first to the third possible implementations of the second aspect, in a fourth possible implementation, the mode configuration command is transmitted by using a radio resource control RRC message, medium access control MAC signaling, or downlink physical layer signaling.

With reference to the fourth possible implementation of the second aspect, in a fifth possible implementation, the mode configuration command further includes subframe configuration information of the backhaul link between the base station and the small cell and the access link of the small cell; and the processing module is further configured to configure a subframe of the small cell according to the subframe configuration information in the mode configuration command after the transceiver module receives the mode configuration command transmitted by the base station; or the mode configuration command is further used to instruct the small cell to use preset subframe configuration information as subframe configuration information of the backhaul link between the base station and the small cell and the access link of the small cell; and the processing module is further configured to configure a subframe of the small cell according to the preset subframe configuration information after the transceiver module receives the mode configuration command transmitted by the base station.

With reference to the fifth possible implementation of the second aspect, in a sixth possible implementation, after the processing module configures the subframe of the small cell according to the subframe configuration information, the transceiver module is further configured to:

transmit, by using an RRC message, MAC signaling, or a physical downlink control channel, the subframe configuration information of the access link of the small cell to a wireless terminal that communicates with the small cell.

With reference to the fifth or the sixth possible implementation of the second aspect, in a seventh possible implementation, a wireless communications system in which the small cell and the base station are located is a Long Term Evolution LTE system;

the first downlink physical channel is a relay-physical downlink control channel R-PDCCH and/or an E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

With reference to the seventh possible implementation of the second aspect, in an eighth possible implementation, if the configuration mode determined by the base station is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

With reference to the seventh possible implementation of the second aspect, in a ninth possible implementation, if the configuration mode determined by the base station is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

With reference to the seventh possible implementation of the second aspect, in a tenth possible implementation, if the configuration mode determined by the base station is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

With reference to any one of the first to the tenth possible implementations of the second aspect, in an eleventh possible implementation, the processing module is specifically configured to:

after a preset configuration delay threshold elapses after the transceiver module receives the mode configuration command, configure a configuration mode of a physical control channel on the backhaul link between the base station and the small cell.

With reference to any one of the first to the eleventh possible implementations of the second aspect, in a twelfth possible implementation, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes; and the processing module is specifically configured to:

configure the configuration mode of the one or more subframes on the backhaul link between the base station and the small cell and the access link of the small cell according to the mode configuration command.

With reference to any one of the second aspect, or the first to the twelfth possible implementations of the second aspect, in a thirteenth possible implementation, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

According to a third aspect, an embodiment of the present invention provides a control channel configuration method, including:

receiving, by a base station, full-duplex capability support information transmitted by a small cell that communicates with the base station, where the full-duplex capability support information is used to indicate whether the small cell supports use of a same physical layer resource for simultaneous reception on a backhaul link and transmission on an access link; and determining, by the base station, a configuration mode of the backhaul link between the base station and the small cell and the access link of the small cell according to the received full-duplex capability support information, where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

With reference to the third aspect, in a first possible implementation, the determining, by the base station, a configuration mode of the backhaul link between the base station and the small cell and the access link of the small cell according to the received full-duplex capability support information includes:

determining, by the base station, the configuration mode of the backhaul link between the base station and the small cell and the access link of the small cell according to the received full-duplex capability support information and at least one of the following factors:

usage of physical layer resources on the backhaul link between the base station and the small cell, detected by the base station;

whether the base station receives a first event transmitted by the small cell, where the first event is used to indicate that a self-interference cancellation gain of the small cell is greater than a preset self-interference cancellation gain threshold; or usage information of the small cell.

With reference to the first possible implementation of the third aspect, in a second possible implementation, the determining, by the base station, a configuration mode of the backhaul link between the base station and the small cell and the access link of the small cell according to the received full-duplex capability support information includes:

when the received full-duplex capability support information indicates that the small cell supports use of the same physical layer resource for simultaneous reception on the backhaul link and transmission on the access link, and it is detected that on the backhaul link between the base station and the small cell, physical layer resources used for downlink data transmission are insufficient, determining, by the base station, that the configuration mode is the second mode or the third mode.

With reference to the second possible implementation of the third aspect, in a third possible implementation, the determining, by the base station, a configuration mode of the backhaul link between the base station and the small cell and the access link of the small cell according to the received full-duplex capability support information includes:

when the received full-duplex capability support information indicates that the small cell supports use of the same physical layer resource for simultaneous reception on the backhaul link and transmission on the access link, and it is detected that on the backhaul link between the base station and the small cell, the physical layer resources used for downlink data transmission are insufficient, but it is detected that on the backhaul link between the base station and the small cell, physical layer resources used for downlink physical layer signaling transmission are sufficient, determining, by the base station, that the configuration mode is the second mode; or when the received full-duplex capability support information indicates that the small cell supports use of the same physical layer resource for simultaneous reception on the backhaul link and transmission on the access link, and it is detected that on the backhaul link between the base station and the small cell, both the physical layer resources used for downlink data transmission and those used for downlink physical layer signaling transmission are insufficient, determining, by the base station, that the configuration mode is the third mode.

With reference to the first possible implementation of the third aspect, in a fourth possible implementation, the determining, by the base station, a configuration mode of the backhaul link between the base station and the small cell and the access link of the small cell according to the received full-duplex capability support information includes:

when the received full-duplex capability support information indicates that the small cell supports use of the same physical layer resource for simultaneous reception on the backhaul link and transmission on the access link, and the first event transmitted by the small cell is received, determining, by the base station, that the configuration mode is the second mode or the third mode.

With reference to the fourth possible implementation of the third aspect, in a fifth possible implementation, the determining, by the base station, a configuration mode of a physical control channel on the backhaul link between the base station and the small cell according to the received full-duplex capability support information includes:

when the received full-duplex capability support information indicates that the small cell supports use of the same physical layer resource for simultaneous reception on the backhaul link and transmission on the access link, and the first event transmitted by the small cell is received, and it is detected that on the backhaul link between the base station and the small cell, physical layer resources of a downlink physical channel used for downlink physical layer signaling transmission are sufficient, determining, by the base station, that the configuration mode is the second mode; or when the received full-duplex capability support information indicates that the small cell supports use of the same physical layer resource for simultaneous reception on the backhaul link and transmission on the access link, and the first event transmitted by the small cell is received, and it is detected that on the backhaul link between the base station and the small cell, physical layer resources used for downlink physical layer signaling transmission are insufficient, determining, by the base station, that the configuration mode is the third mode.

With reference to any one of the first to the fifth possible implementations of the third aspect, in a sixth possible implementation, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;
  downlink coverage information of the small cell; or
  a downlink transmit power value of the small cell.

With reference to any one of the third aspect, or the first to the sixth possible implementations of the third aspect, in a seventh possible implementation, the determining, by the base station, a configuration mode of the backhaul link between the base station and the small cell and the access link of the small cell according to the received full-duplex capability support information includes:
  when the received full-duplex capability support information indicates that the small cell does not support use of the same physical layer resource for simultaneous reception on the backhaul link and transmission on the access link, determining, by the base station, that the configuration mode is the first mode.

With reference to any one of the third aspect, or the first to the seventh possible implementations of the third aspect, in an eighth possible implementation, after the determining, by the base station, a configuration mode of the backhaul link between the base station and the small cell and the access link of the small cell according to the received full-duplex capability support information, the method further includes:
  transmitting, by the base station, a mode configuration command to the small cell, where the mode configuration command is used to configure the configuration mode of the backhaul link between the base station and the small cell and the access link of the small cell as the determined configuration mode.

With reference to the eighth possible implementation of the third aspect, in a ninth possible implementation, the mode configuration command is transmitted by using a radio resource control RRC message, medium access control MAC signaling, or downlink physical layer signaling.

With reference to the eighth or the ninth possible implementation of the third aspect, in a tenth possible implementation,
  the mode configuration command further includes subframe configuration information of the backhaul link between the base station and the small cell and the access link of the small cell; or
  the mode configuration command is further used to instruct the small cell to use preset subframe configuration information as subframe configuration information of the backhaul link between the base station and the small cell and the access link of the small cell.

With reference to the tenth possible implementation of the third aspect, in an eleventh possible implementation, a wireless communications system in which the small cell and the base station are located is a Long Term Evolution LTE system;
  the first downlink physical channel is a relay-physical downlink control channel R-PDCCH and/or an enhanced physical downlink control channel E-PDCCH;
  the second downlink physical channel is a physical downlink control channel PDCCH;
  the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;
  the second mode is: the small cell receives, by using the PDCCH on the backhaul link, the physical layer signaling transmitted by the base station, and the subframe on the access link of the small cell is a normal subframe; and
  the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

With reference to the eleventh possible implementation of the third aspect, in a twelfth possible implementation,
  if the configuration mode determined by the base station is the first mode,
  the subframe configuration information is used to indicate:
  in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and
  in a downlink subframe on the access link of the small cell, first two OFDM symbols may be used for physical layer signaling transmission, a third OFDM symbol and a last OFDM symbol are used as transmission gaps, and other OFDM symbols are vacant.

With reference to the eleventh possible implementation of the third aspect, in a thirteenth possible implementation,
  if the configuration mode determined by the base station is the second mode,
  the subframe configuration information is used to indicate:
  in a downlink subframe on the backhaul link between the base station and the small cell, first three OFDM symbols may be used for physical layer signaling transmission, and other OFDM symbols may be used for data transmission; and
  in a downlink subframe on the access link of the small cell, first three OFDM symbols may be used for physical layer signaling transmission, and other OFDM symbols may be used for data transmission.

With reference to the eleventh possible implementation of the third aspect, in a fourteenth possible implementation,
  if the configuration mode determined by the base station is the third mode,
  the subframe configuration information is used to indicate:
  in a downlink subframe on the backhaul link between the base station and the small cell, first three OFDM symbols may be used for physical layer signaling transmission, and other OFDM symbols are used for data transmission and physical layer signaling transmission; and
  in a downlink subframe on the access link of the small cell, first three OFDM symbols may be used for physical layer signaling transmission, and other OFDM symbols may be used for data transmission.

With reference to any one of the eighth to the fourteenth possible implementations of the third aspect, in a fifteenth possible implementation, the configuration mode is intended for one or more subframes of the small cell; and
  the mode configuration command includes identifier information of the one or more subframes; or
  the one or more subframes are specified in advance, and the mode configuration command includes activation information for activating or deactivating the configuration mode used for the one or more subframes.

With reference to any one of the third aspect, or the first to the fifteenth possible implementations of the third aspect, in a sixteenth possible implementation, the determining, by the base station, a configuration mode of the backhaul link between the base station and the small cell and the access link of the small cell according to the received full-duplex capability support information includes:

periodically determining, by the base station, the configuration mode of the backhaul link between the base station and the small cell and the access link of the small cell; or when a waiting delay of data transmitted to the small cell is greater than a preset waiting delay threshold, determining, by the base station, the configuration mode of the backhaul link between the base station and the small cell and the access link of the small cell.

With reference to any one of the third aspect, or the first to the sixteenth possible implementations of the third aspect, in a seventeenth possible implementation, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

According to a fourth aspect, an embodiment of the present invention provides a control channel configuration method, including:

determining, by a small cell, full-duplex capability support information of the small cell, where the full-duplex capability support information is used to indicate whether the small cell supports use of a same physical layer resource for simultaneous reception on a backhaul link and transmission on an access link; and transmitting, by the small cell, the determined full-duplex capability support information to a base station to instruct the base station to determine a configuration mode of the backhaul link between the base station and the small cell and the access link of the small cell according to the full-duplex capability support information; where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

With reference to the fourth aspect, in a first possible implementation, after the transmitting, by the small cell, the determined full-duplex capability support information to the base station, the method further includes:

receiving, by the small cell, a mode configuration command transmitted by the base station, where the mode configuration command is used to indicate the configuration mode of the backhaul link between the base station and the small cell and the access link of the small cell; and configuring, by the small cell, the configuration mode of the backhaul link between the base station and the small cell and the access link of the small cell according to the mode configuration command.

With reference to the first possible implementation of the fourth aspect, in a second possible implementation, before the receiving, by the small cell, the mode configuration command transmitted by the base station, the method further includes:

when a self-interference cancellation gain of the small cell is greater than a preset self-interference cancellation gain threshold, transmitting, by the small cell, a first event to the base station, and/or transmitting, by the small cell, usage information of the small cell to the base station, to instruct the base station to determine the configuration mode of the backhaul link between the base station and the small cell and the access link of the small cell according to the full-duplex capability support information and at least one of the following factors:

whether the base station receives the first event; or the usage information of the small cell.

With reference to the second possible implementation of the fourth aspect, in a third possible implementation, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

With reference to any one of the first to the third possible implementations of the fourth aspect, in a fourth possible implementation, the mode configuration command is transmitted by using a radio resource control RRC message, medium access control MAC signaling, or downlink physical layer signaling.

With reference to the fourth possible implementation of the fourth aspect, in a fifth possible implementation, the mode configuration command further includes subframe configuration information of the backhaul link between the base station and the small cell and the access link of the small cell; and after the receiving, by the small cell, the mode configuration command transmitted by the base station, the method further includes: configuring, by the small cell, a subframe of the small cell according to the subframe configuration information in the mode configuration command; or the mode configuration command is further used to instruct the small cell to use preset subframe configuration information as subframe configuration information of the backhaul link between the base station and the small cell and the access link of the small cell; and after the receiving, by the small cell, the mode configuration command transmitted by the base station, the method further includes: configuring, by the small cell, a subframe of the small cell according to the preset subframe configuration information.

With reference to the fifth possible implementation of the fourth aspect, in a sixth possible implementation, after the configuring, by the small cell, a subframe of the small cell according to the subframe configuration information, the method further includes:

transmitting, by the small cell by using an RRC message, MAC signaling, or a physical downlink control channel, the subframe configuration information of the access link of the small cell to a wireless terminal that communicates with the small cell.

With reference to the fifth or the sixth possible implementation of the fourth aspect, in a seventh possible implementation, a wireless communications system in which the small cell and the base station are located is a Long Term Evolution LTE system;

the first downlink physical channel is a relay-physical downlink control channel R-PDCCH and/or an E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

With reference to the seventh possible implementation of the fourth aspect, in an eighth possible implementation, if the configuration mode determined by the base station is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

With reference to the seventh possible implementation of the fourth aspect, in a ninth possible implementation, if the configuration mode determined by the base station is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

With reference to the seventh possible implementation of the fourth aspect, in a tenth possible implementation, if the configuration mode determined by the base station is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

With reference to any one of the first to the tenth possible implementations of the fourth aspect, in an eleventh possible implementation, the configuring, by the small cell, a configuration mode of a physical control channel on the backhaul link between the base station and the small cell according to the mode configuration command includes:

after a preset configuration delay threshold elapses after the mode configuration command is received, configuring, by the small cell, the configuration mode of the physical control channel on the backhaul link between the base station and the small cell.

With reference to any one of the first to the eleventh possible implementations of the fourth aspect, in a twelfth possible implementation, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes; and the configuring, by the small cell, the configuration mode of the backhaul link between the base station and the small cell and the access link of the small cell according to the mode configuration command includes:

configuring, by the small cell, the configuration mode of the one or more subframes on the backhaul link between the base station and the small cell and the access link of the small cell according to the mode configuration command.

With reference to any one of the fourth aspect, or the first to the twelfth possible implementations of the fourth aspect, in a thirteenth possible implementation, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

In the embodiments of the present invention, the small cell transmits the full-duplex capability support information of the small cell to the base station, where the full-duplex capability support information is used to indicate whether the small cell supports use of the same physical layer resource for simultaneous reception on the backhaul link and transmission on the access link; and the base station determines the configuration mode of the backhaul link between the base station and the small cell and the access link of the small cell according to the received full-duplex capability support information, where the configuration mode is one of the first mode, the second mode, or the third mode.

In the second mode, the small cell receives, by using the second downlink physical channel on the backhaul link, the physical layer signaling transmitted by the base station, but the second downlink physical channel is a conventional downlink physical channel used for physical layer signaling transmission between the base station and a wireless terminal and does not need to occupy any physical layer resource of a downlink physical channel used for data transmission between the base station and the small cell. Therefore, physical resources of the downlink physical channel used for data transmission on the backhaul link are saved, data transmission efficiency is improved, and a problem of resource waste is avoided. In addition, because the second mode is determined according to the full-duplex capability support information of the small cell, the full-duplex capability of the small cell is considered, and therefore, communication quality is also ensured.

In the third mode, the small cell receives, by using the first downlink physical channel and the second downlink physical channel on the backhaul link, the physical layer signaling transmitted by the base station, and all the physical layer resources on the access link of the small cell may be used for downlink transmission by the small cell. This also implements full-duplex transmission by the small cell, and also considers that physical layer resources used for physical layer signaling transmission on the backhaul link may be insufficient. Therefore, the small cell receives, by using the first downlink physical channel and the second downlink physical channel, the physical layer signaling transmitted by the base station, and this alleviates the problem that the physical layer resources used for physical layer signaling transmission are insufficient. In addition, similar to the second mode, because the second downlink physical channel does not need to occupy any physical layer resource of the downlink physical channel used for data transmission between the base station and the small cell, the physical resources of the downlink physical channel used for data transmission on the backhaul link are saved, data transmission efficiency is improved, and the problem of resource waste is avoided. In addition, because the second mode is determined according to the full-duplex capability support information of the small cell, the full-duplex capability of the small cell is considered, and therefore, communication quality is also ensured.

In addition, considering that the small cell may not support use of the same physical layer resource for simultaneous reception on the backhaul link and transmission on the access link, the first mode is further configured. This avoids possible interference caused when the small cell uses the same physical layer resource for simultaneous reception on the backhaul link and transmission on the access link if the small cell does not support use of the same physical layer resource for simultaneous reception on the backhaul link and transmission on the access link.

Therefore, in the embodiments of the present invention, according to whether the small cell supports use of the same physical layer resource for simultaneous reception on the backhaul link and transmission on the access link, an appropriate configuration mode is determined comprehensively. Therefore, not only communication quality is ensured, but also resource waste can be avoided.

DESCRIPTION OF EMBODIMENTS

Figure 1:
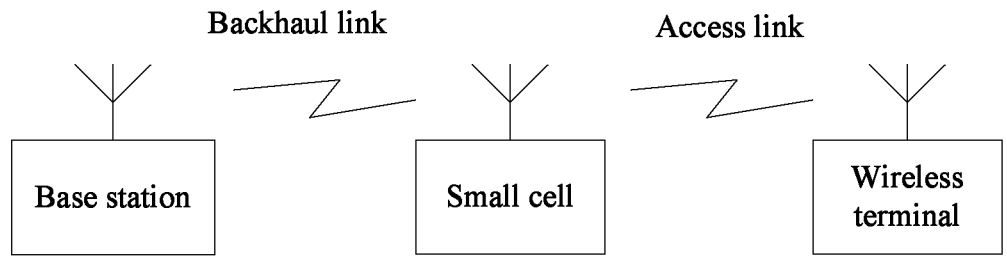
FIG. 1 is a schematic diagram of a communication mode between a small cell and a base station and between the small cell and a wireless terminal.

Recently, a research series in Stanford University shows that a wireless communications device can implement simultaneous transmission and reception on a same carrier by using advanced self-interference cancellation methods (advanced self-interference cancellation schemes), that is, full-duplex on the same carrier, referred to as "full-duplex" for short in embodiments of the present invention. From a physical layer perspective, this causes a throughput of a physical layer to be doubled, and generates innovative impact on an implementation of medium access control (Medium Access Control, MAC), so that a future wireless communications system can obtain a higher throughput.

Documents related to the research include:

document 1: "Practical, Real-time, Full Duplex Wireless Communication" published by Jain M and the like in the magazine MobiCom'11 ([1] Jain M, Choi J, Kim T, Bharadia D, Seth S, Srinivasan K, Levis P, Katti S, Sinha P: "Practical, Real-time, Full Duplex Wireless", MobiCom'11);

document 2: "Achieving Single Channel, Full Duplex Wireless Communication" published by Choi J and the like in the magazine Mobicom'10 (Choi J, Jain M, Srinivasan K, Levis P, Katti S: "Achieving Single Channel, Full Duplex Wireless Communication", Mobicom'10);

document 3: "Rethinking Indoor Wireless Mesh Design: Low Power, Low Frequency, Full-Duplex" published by Radunovic B, Gunawardena D, Key P, and Proutiere A on the link http://research.microsoft.com/pubs/13336/main-.pdf (Radunovic B, Gunawardena D, Key P, Proutiere A: "Rethinking Indoor Wireless Mesh Design: Low Power, Low Frequency, Full-Duplex");

document 4: "Empowering Full-Duplex Wireless Communication by Exploiting Directional Diversity" published by Everett E and the like in the magazine Asilomar 2011 (Everett E, Duarte M, Dick C, Sabharwal A: "Empowering Full-Duplex Wireless Communication by Exploiting Directional Diversity", Asilomar 2011); and document 5: "Pushing the limits of Full-Duplex: Design and Real-time Implementation" published by Achaleshwar Sahai and the like in the technical report TREE1104 of Rice University (Achaleshwar Sahai, Gaurav Patel and Ashutosh Sabharwal: "Pushing the limits of Full-duplex: Design and Real-time Implementation", Rice university technical report TREE1104).

Based on the research in Stanford University, if a small cell implements full-duplex communication on a same carrier, transmission of a physical control channel on a backhaul link such as an R-PDCCH is no longer necessary. However, the small cell is not always capable of implementing full duplex. This depends on many factors such as a wireless communications environment in which the small cell is located and an anti-interference capability of the small cell.

In view of this, the embodiments of the present invention provide a base station, a small cell, and a subframe configuration method to resolve the foregoing problem of resource waste caused when an additional physical control channel is used on a backhaul link of a small cell to transmit control information. Therefore, not only resource waste can be avoided, but also communication quality can be ensured.

In an embodiment of the present invention, a small cell transmits full-duplex capability support information of the small cell to a base station, where the full-duplex capability support information is used to indicate whether the small cell supports use of a same physical layer resource for simultaneous reception on a backhaul link and transmission on an access link; and the base station determines a configuration mode of the backhaul link between the base station and the small cell and the access link of the small cell according to the received full-duplex capability support information, where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

In the second mode, the small cell receives, by using the second downlink physical channel on the backhaul link, the physical layer signaling transmitted by the base station, but the second downlink physical channel is a conventional downlink physical channel used for physical layer signaling transmission between the base station and a wireless terminal and does not need to occupy any physical layer resource of a downlink physical channel used for data transmission between the base station and the small cell. Therefore, physical resources of the downlink physical channel used for data transmission on the backhaul link are saved, data transmission efficiency is improved, and a problem of resource waste is avoided. In addition, because the second mode is determined according to the full-duplex capability support information of the small cell, the full-duplex capability of the small cell is considered, and therefore, communication quality is also ensured.

In the third mode, the small cell receives, by using the first downlink physical channel and the second downlink physical channel on the backhaul link, the physical layer signaling transmitted by the base station, and all the physical layer resources on the access link of the small cell may be used for downlink transmission by the small cell. This also implements full-duplex transmission by the small cell, and also considers that physical layer resources used for physical layer signaling transmission on the backhaul link may be insufficient. Therefore, the small cell receives, by using the first downlink physical channel and the second downlink physical channel, the physical layer signaling transmitted by the base station, and this alleviates the problem that the physical layer resources used for physical layer signaling transmission are insufficient. In addition, similar to the second mode, because the second downlink physical channel does not need to occupy any physical layer resource of the downlink physical channel used for data transmission between the base station and the small cell, the physical resources of the downlink physical channel used for data transmission on the backhaul link are saved, data transmission efficiency is improved, and the problem of resource waste is avoided. In addition, because the second mode is determined according to the full-duplex capability support information of the small cell, the full-duplex capability of the small cell is considered, and therefore, communication quality is also ensured.

In addition, considering that the small cell may not support use of the same physical layer resource for simultaneous reception on the backhaul link and transmission on the access link, the first mode is further configured. This avoids possible interference caused when the small cell uses the same physical layer resource for simultaneous reception on the backhaul link and transmission on the access link if the small cell does not support use of the same physical layer resource for simultaneous reception on the backhaul link and transmission on the access link.

Therefore, in this embodiment of the present invention, according to whether the small cell supports use of the same physical layer resource for simultaneous reception on the backhaul link and transmission on the access link, an appropriate configuration mode is determined comprehensively. Therefore, not only communication quality is ensured, but also resource waste can be avoided.

The embodiments of the present invention are hereinafter described in detail with reference to accompanying drawings.

First, to help understand the embodiments of the present invention, the following describes an application scenario and related concepts in the embodiments of the present invention.

As described above, in a wireless communications system, to extend coverage of a base station, a small cell is introduced. The small cell is located between a conventional base station and a wireless terminal, and forwards data transmitted between the wireless terminal and the base station.

Figure 2:
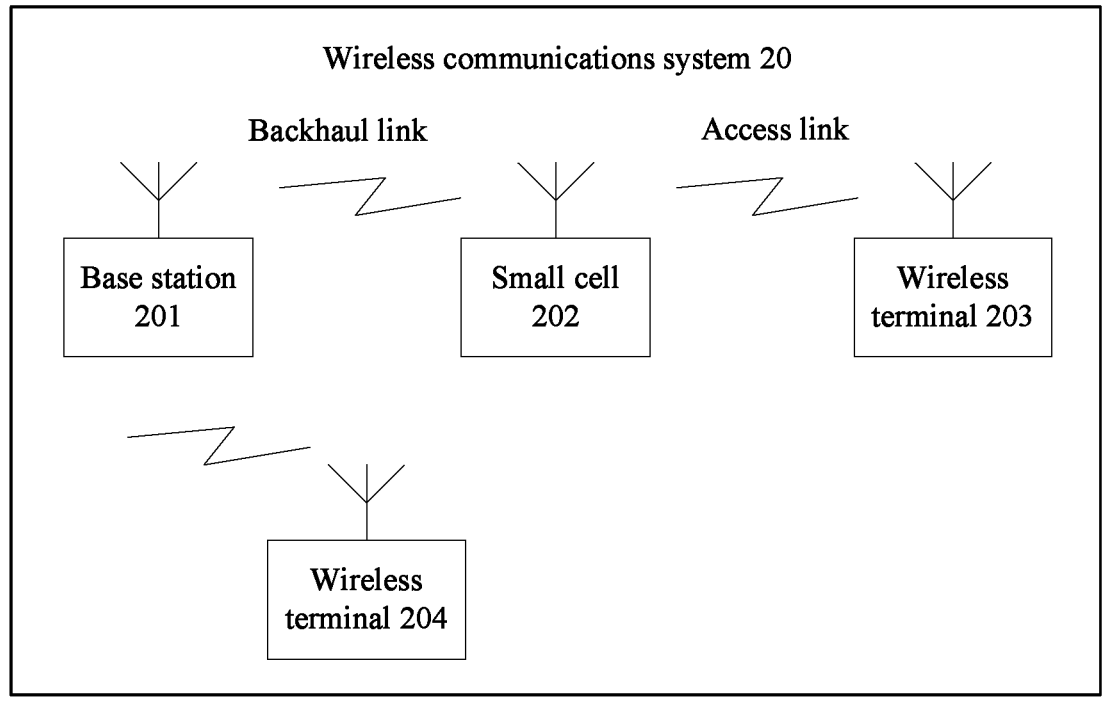
FIG. 2 is a schematic structural diagram of a wireless communications system according to an embodiment of the present invention.

In a wireless communications system 20 shown in FIG. 2, a radio link between a base station 201 and a small cell 202 is referred to as "a backhaul link" (backhaul link), and a radio link between the small cell 202 and a wireless terminal 203 is referred to as "an access link" (access link). In addition, the wireless communications system 20 further includes a wireless terminal 204 that directly communicates with the base station 201, and communication between the wireless terminal 204 and the base station 201 does not need to be forwarded by the small cell 202.

For clear description, in the wireless communications system 20 in FIG. 2, only one base station 201, one small cell 202, one wireless terminal 203, and one wireless terminal 204 are shown. However, persons skilled in the art should know that a wireless communications system may include one or more base stations, one or more small cells, one or more wireless terminals 203, and one or more wireless terminals 204.

Communications standards of the wireless communications system 20 may include but are not limited to: the Global System for Mobile Communication (Global System for Mobile communication, GSM), Code Division Multiple Access (Code Division Multiple Access, CDMA) IS-95, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), Time Division Duplex-Long Term Evolution (Time Division Duplexing-Long Term Evolution, TDD LTE), Frequency Division Duplex-Long Term Evolution (Frequency Division Duplexing-Long Term Evolution, FDD LTE), Long Term Evolution-Advanced (Long Term Evolution-Advanced, LTE-advanced), Personal Handy-Phone System (Personal Handy-phone System, PHS), Wireless Local Area Network (Wireless Local Network, WLAN) System specified in the 802.11 protocol series, and the like.

Figure 3:
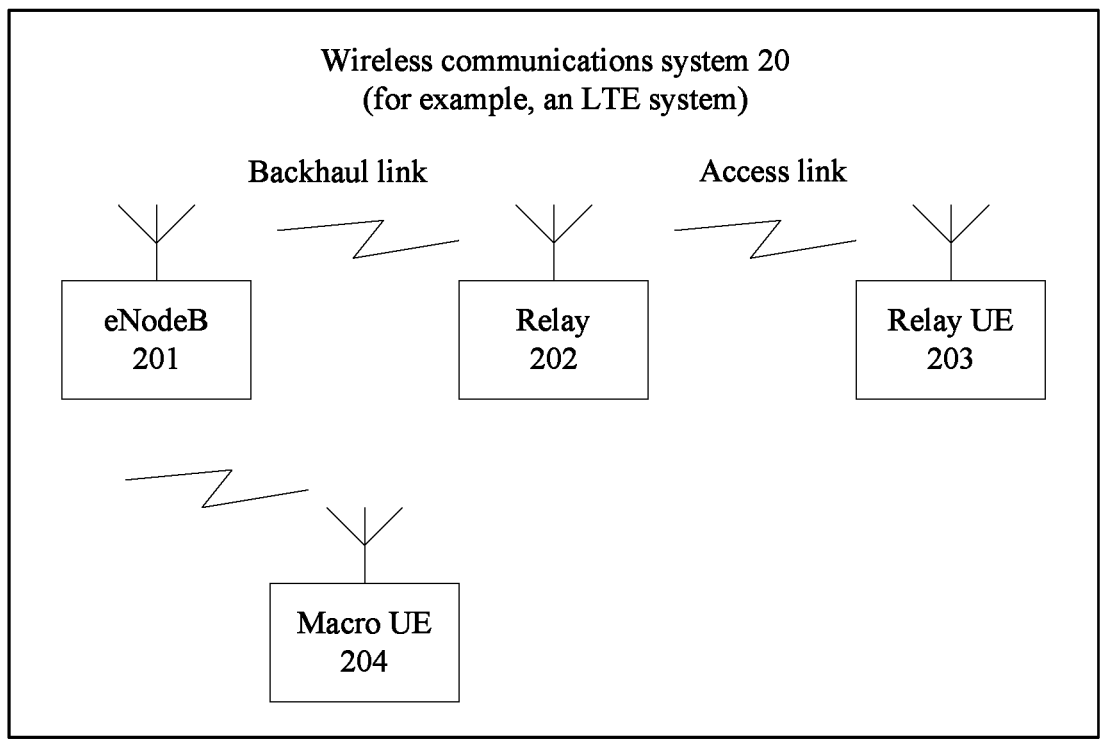
FIG. 3 is a schematic structural diagram of an LTE system according to an embodiment of the present invention.

For an LTE system such as TDD LTE, FDD LTE, or LTE-A, the base station 201 in the wireless communications system 20 is an evolved NodeB (evolved NodeB, eNodeB), the small cell 202 may be a relay node (Relay), and the wireless terminal 203 and the wireless terminal 204 are user equipment (User Equipment, UE). When the small cell 202 is a relay node, the wireless terminal 203 is also referred to as "relay UE" (Relay UE). The wireless terminal 203 is also referred to as "macro UE (Macro UE)". A structure of the LTE system is shown in FIG. 3. The foregoing wireless communications system specified in the 3GPP release 10 is an LTE system.

The following prescribes terms in the embodiments of the present invention.

A first downlink physical channel is used for physical layer signaling transmission on a backhaul link between a base station and a small cell, and occupies a physical layer resource of a downlink physical channel used for data transmission between the base station and the small cell, for example, an R-PDCCH channel or an enhanced-physical downlink control channel (Enhanced-Physical Downlink Control CHannel, E-PDCCH) in the LTE system.

A second downlink physical channel is a conventional downlink physical channel used for physical layer signaling transmission between the base station and a wireless terminal, for example, a PDCCH channel in the LTE system.

With reference to FIG. 2, the following describes in detail the wireless communications system 20 provided by an embodiment of the present invention.

In the wireless communications system 20 shown in FIG. 2, the small cell 202 is configured to determine full-duplex capability support information of the small cell, where the full-duplex capability support information is used to indicate whether the small cell supports use of a same physical layer resource for simultaneous reception on a backhaul link and transmission on an access link; and transmit the determined full-duplex capability support information to the base station 201; and the base station 201 is configured to receive the full-duplex capability support information transmitted by the small cell 202, and determine, according to the received full-duplex capability support information, a configuration mode of the backhaul link between the base station 201 and the small cell 202 and the access link of the small cell 202, where the configuration mode is one of the following modes:

a first mode: the small cell 202 receives, by using a first downlink physical channel on the backhaul link, physical layer signaling transmitted by the base station 201, and other physical layer resources on the access link of the small cell 202 than a physical layer resource occupied by the backhaul link of the small cell 202 may be used for downlink transmission by the small cell 202;

a second mode: the small cell 202 receives, by using a second downlink physical channel on the backhaul link, physical layer signaling transmitted by the base station 201, and all physical layer resources on the access link of the small cell 202 may be used for downlink transmission by the small cell 202; or a third mode: the small cell 202 receives, by using a first downlink physical channel and a second downlink physical channel on the backhaul link, physical layer signaling transmitted by the base station 201, and all physical layer resources on the access link of the small cell 202 may be used for downlink transmission by the small cell 202.

The base station 201 is a network device that has a radio link connection to the small cell 202. For example, if the wireless communications system 20 is an LTE system, the base station 201 may be an evolved NodeB (evolved NodeB, eNodeB) in the system; if the wireless communications system 20 is a WLAN system, the base station 201 may be an access point (Access Point, AP) in the system; if the wireless communications system 20 is a TD-SCDMA or WCDMA system, the base station 201 may be a NodeB (NodeB) in the system, or a radio access network device including a radio network controller (Radio Network Controller, RNC) and a NodeB; or if the wireless communications system 20 is a GSM system, the base station 201 may be a base transceiver station (Base Transceiver Station, BTS) in the system, or a base station subsystem (Base Station Subsystem, BSS) device including a base station controller (Base Station Controller, BSC) and a BTS.

The small cell 202 may be a device that is connected to the base station 201 by using a radio link in the wireless communications system 20 and through which the base station 201 communicates with a wireless terminal.

A physical channel may be used to transmit physical layer signaling and data. The data includes higher layer data and higher layer signaling over a physical layer. The higher layer signaling is transmitted as physical layer data on the physical channel.

After determining the configuration mode, the base station 201 may implement switching of the configuration mode of the backhaul link between the base station 201 and the small cell 202 and the access link of the small cell 202.

Switching from the first mode to the second mode or the third mode may be semi-static, and switching between the second mode and the third mode may be dynamic. The semi-static indicates that a period of switching between the configuration modes is not less than a length of a radio frame; and the dynamic indicates that the period of switching between the configuration modes is less than the length of the radio frame.

Optionally, the base station 201 may periodically determine the configuration mode of the backhaul link between the base station 201 and the small cell 202 and the access link of the small cell 202; or when a waiting delay of data transmitted to the small cell 202 is greater than a preset waiting delay threshold, the base station 201 determines the configuration mode of the backhaul link between the base station 201 and the small cell 202 and the access link of the small cell 202.

After the base station 201 determines the configuration mode of the backhaul link between the base station 201 and the small cell 202 and the access link of the small cell 202, optionally, the base station 201 transmits a mode configuration command to the small cell 202, where the mode configuration command is used to configure the configuration mode of the backhaul link between the base station 201 and the small cell 202 and the access link of the small cell 202 as the determined configuration mode.

Optionally, the mode configuration command may be transmitted by using a radio resource control (Radio Resource Control, RRC) message, medium access control (Medium Access Control, MAC) signaling, or downlink physical layer signaling.

For example, the mode configuration command is transmitted to the small cell 202 by using system information in the RRC message. For example, for the LTE system, the mode configuration command may be transmitted to the small cell 202 by using an existing R-PDCCH configuration command, or a PDCCH configuration command, or an E-PDCCH configuration command.

For another example, the mode configuration command may be further transmitted to the small cell 202 by using physical layer signaling carried on a PDCCH, an R-PDCCH, or an E-PDCCH.

The small cell 202 configures the configuration mode of the backhaul link between the base station 201 and the small cell 202 and the access link of the small cell 202 according to the received mode configuration command.

Optionally, after receiving the mode configuration command, the small cell 202 may immediately configure the configuration mode of the backhaul link between the base station 201 and the small cell 202 and the access link of the small cell 202 according to the mode configuration command, or may configure a configuration mode of a physical control channel on the backhaul link between the base station 201 and the small cell 202 according to the mode configuration command after a preset configuration delay threshold elapses after the mode configuration command is received.

Optionally, the configuration mode determined by the base station 201 is intended for one or more subframes of the small cell 202; and the mode configuration command may include identifier information of the one or more subframes; or the one or more subframes are specified in advance, and the mode configuration command includes activation information for activating or deactivating the configuration mode used for the one or more subframes. After receiving the mode configuration command, the small cell 202 configures the configuration mode of the one or more subframes on the backhaul link between the base station and the small cell and the access link of the small cell.

Optionally, the mode configuration command may further include subframe configuration information of the backhaul link between the base station 201 and the small cell 202 and the access link of the small cell 202; and after receiving the mode configuration command transmitted by the base station 201, the small cell 202 may configure a subframe of the small cell 202 according to the subframe configuration information in the mode configuration command; or the mode configuration command is further used to instruct the small cell 202 to use preset subframe configuration information as subframe configuration information of the backhaul link between the base station 201 and the small cell 202 and the access link of the small cell 202; and the small cell 202 configures a subframe of the small cell according to the preset subframe configuration information after receiving the mode configuration command transmitted by the base station 201.

Optionally, after the small cell 202 configures the subframe of the small cell according to the subframe configuration information in the received mode configuration command or the preset subframe configuration information, the small cell 202 transmits, by using an RRC message, MAC signaling, or a physical downlink control channel, the subframe configuration information of the access link of the small cell to a wireless terminal that communicates with the small cell.

Optionally, the subframe configuration information may be intended for one or more subframes on the backhaul link of the small cell 202, and one or more subframes on the access link. Therefore, the subframe configuration information in the mode configuration command or the preset subframe configuration information may include different configuration information for multiple subframes.

Hereinafter in an example 5, the LTE system is used as an example to provide a solution to implementing the subframe configuration information.

The following describes an optional solution to determining the configuration mode by the base station 201.

It should be noted that, multiple solutions to determining the configuration mode by the base station may exist, and are not limited to the solution mentioned in this embodiment of the present invention. Any solution that can avoid resource waste caused by occupying a physical layer resource used for data transmission when an additional physical control channel is used on the backhaul link and can ensure communication quality should be considered as a feasible solution to determining the configuration mode by the base station 201 in this embodiment of the present invention, and shall fall within the protection scope of this patent.

The base station 201 may determine the configuration mode of the backhaul link between the base station 201 and the small cell 202 and the access link of the small cell 202 according to a factor 1, namely, the received full-duplex capability support information, and at least one of the following factors:

factor 2: usage of physical layer resources on the backhaul link between the base station 201 and the small cell 202, detected by the base station 201;

factor 3: whether the base station 201 receives a first event transmitted by the small cell 202, where the first event is used to indicate that a self-interference cancellation gain of the small cell 202 is greater than a preset self-interference cancellation gain threshold; where the self-interference cancellation gain is used to represent a capability of a receiver of the small cell 202 to cancel interference caused by a signal transmitted by the small cell 202, and if a value is greater, the interference cancellation capability is stronger, and an anti-interference capability is stronger; or factor 4: the usage information of the small cell 202.

When the self-interference cancellation gain of the small cell 202 is greater than the preset self-interference cancellation gain threshold, the small cell 202 may transmit the first event to the base station 201. The small cell 202 may also transmit the usage information of the small cell 202 to the base station 201.

The usage information of the small cell 202 may include one or more items in the following information:

a quantity of wireless terminals that currently communicate with the small cell 202, for example, in the LTE system, a quantity of relay UE that communicates with the base station 201 by using the small cell 202;

a data volume of downlink data buffered by the small cell 202;

information about a to-be-reached communication quality indicator fed back by a wireless terminal that currently communicates with the small cell 202, for example, a quality of service class identifier (Quality of Service Class INdentifier, QCI), where if a QCI requirement is higher, to meet the QCI requirement, more downlink physical layer resources need to be occupied by the wireless terminal for downlink data transmission; in this case, it is expected that no first downlink physical channel such as the R-PDCCH in the LTE system occupies a physical layer resource of a downlink physical channel used for data transmission, for example, a PDSCH channel;

a power value of the access link that the small cell 202 needs to reduce if the mode is switched to the second mode, where if the mode is switched to the second mode, the small cell 202 may need to reduce a transmit power value of the access link to reduce interference to the backhaul link of the small cell 202, and this may cause reduction of communication quality on the access link of the small cell 202;

a power value of the access link that the small cell 202 needs to reduce if the mode is switched to the third mode, where if the mode is switched to the third mode, the small cell 202 may also need to reduce a transmit power value of the access link to reduce interference to the backhaul link of the small cell 202, and this may cause reduction of communication quality on the access link of the small cell 202;

a quantity of wireless terminals that need to be handed over to other cells among wireless terminals that currently communicate with the small cell 202 if the mode is switched to the second mode, where after the mode is switched to the second mode, interference caused by the access link of the small cell 202 to the backhaul link is increased, and therefore, wireless terminals at a coverage edge of the small cell 202 possibly cannot communicate with the base station 201 through the small cell 202, and the wireless terminals may need to be handed over to other base stations or small cells for communication;

a quantity of wireless terminals that need to be handed over to other cells among wireless terminals that currently communicate with the small cell 202 if the mode is switched to the third mode, where similar to the second mode, if the mode is switched to the third mode, interference caused by the access link of the small cell 202 to the backhaul link is increased, and therefore, wireless terminals at a coverage edge of the small cell 202 possibly cannot communicate with the base station 201 through the small cell 202, and the wireless terminals may need to be handed over to other base stations or small cells for communication;

downlink coverage information of the small cell 202, for example, a coverage radius of the small cell 202; or a downlink transmit power value of the small cell 202.

The following describes optional implementations of determining the configuration mode by the base station 201 according to the factor 1 to the factor 4 by using an example 1 to an example 4.

Example 1

In the example 1, the base station 201 determines the configuration mode according to the factor 1 and the factor 2.

Optionally, if the full-duplex capability support information indicates that the small cell 202 supports use of the same physical layer resource for simultaneous reception on the backhaul link and transmission on the access link, and on the backhaul link between the base station 201 and the small cell 202, physical layer resources used for downlink data transmission are insufficient, it is determined that the configuration mode is the second mode or the third mode.

For example, when the received full-duplex capability support information indicates that the small cell 202 supports use of the same physical layer resource for simultaneous reception on the backhaul link and transmission on the access link, and it is detected that on the backhaul link between the base station 201 and the small cell 202, the physical layer resources used for downlink data transmission are insufficient, but it is detected that on the backhaul link between the base station 201 and the small cell 202, physical layer resources used for downlink physical layer signaling transmission are sufficient, the base station 201 determines that the configuration mode is the second mode; or when the received full-duplex capability support information indicates that the small cell 202 supports use of the same physical layer resource for simultaneous reception on the backhaul link and transmission on the access link, and it is detected that on the backhaul link between the base station 201 and the small cell 202, both the physical layer resources used for downlink data transmission and those used for downlink physical layer signaling transmission are insufficient, the base station 201 determines that the configuration mode is the third mode; or when the received full-duplex capability support information indicates that the small cell 202 does not support use of the same physical layer resource for simultaneous reception on the backhaul link and transmission on the access link, the base station 201 determines that the configuration mode is the first mode.

An optional implementation solution of the example 1 is shown in Table 1:

TABLE 1

| Full-duplex capability support information | Physical layer resources used for downlink data transmission on the backhaul link | Physical layer resources used for downlink physical layer signaling transmission on the backhaul link | Configuration mode |
|---|---|---|---|
| Yes | Insufficient | Sufficient | Second mode |
| Yes | Insufficient | Insufficient | Third mode |
| No | — | — | First mode |

Example 2

In the example 2, the base station 201 determines the configuration mode according to the factor 1 and the factor 3.

When the received full-duplex capability support information indicates that the small cell 202 supports use of the same physical layer resource for simultaneous reception on the backhaul link and transmission on the access link, and the first event transmitted by the small cell 202 is received, the base station 201 determines that the configuration mode is the second mode or the third mode.

For example, when the received full-duplex capability support information indicates that the small cell 202 supports use of the same physical layer resource for simultaneous reception on the backhaul link and transmission on the access link, and the first event transmitted by the small cell 202 is received, and it is detected that on the backhaul link between the base station 201 and the small cell 202, physical layer resources of a downlink physical channel used for downlink physical layer signaling transmission are sufficient, the base station 201 determines that the configuration mode is the second mode; or when the received full-duplex capability support information indicates that the small cell 202 supports use of the same physical layer resource for simultaneous reception on the backhaul link and transmission on the access link, and the first event transmitted by the small cell 202 is received, and it is detected that on the backhaul link between the base station 201 and the small cell 202, physical layer resources of a downlink physical channel used for downlink physical layer signaling transmission is insufficient, the base station 201 determines that the configuration mode is the third mode; or when the received full-duplex capability support information indicates that the small cell 202 does not support use of the same physical layer resource for simultaneous reception on the backhaul link and transmission on the access link, the base station 201 determines that the configuration mode is the first mode.

An optional implementation solution of the example 2 is shown in Table 2:

TABLE 2

| Full-duplex capability support information | Whether the first event transmitted by the small cell 202 is received | Physical layer resources used for downlink physical layer signaling transmission on the backhaul link | Configuration mode |
|---|---|---|---|
| Yes | Yes | Sufficient | Second mode |
| Yes | Yes | Insufficient | Third mode |
| No | — | — | First mode |

Example 3

In the example 3, the base station 201 determines the configuration mode according to the factor 1 to the factor 3.

When the received full-duplex capability support information indicates that the small cell 202 supports use of the same physical layer resource for simultaneous reception on the backhaul link and transmission on the access link, and the first event transmitted by the small cell 202 is received, and it is detected that on the backhaul link between the base station 201 and the small cell 202, physical layer resources used for downlink data transmission are insufficient, the base station 201 determines that the configuration mode is the second mode or the third mode.

For example, when the received full-duplex capability support information indicates that the small cell 202 supports use of the same physical layer resource for simultaneous reception on the backhaul link and transmission on the access link, and the first event transmitted by the small cell 202 is received, and it is detected that on the backhaul link between the base station 201 and the small cell 202, the physical layer resources used for downlink data transmission are insufficient, but it is detected that on the backhaul link between the base station 201 and the small cell 202, physical layer resources of a downlink physical channel used for downlink physical layer signaling transmission are sufficient, the base station 201 determines that the configuration mode is the second mode; or when the received full-duplex capability support information indicates that the small cell 202 supports use of the same physical layer resource for simultaneous reception on the backhaul link and transmission on the access link, and the first event transmitted by the small cell 202 is received, and it is detected that on the backhaul link between the base station 201 and the small cell 202, both the physical layer resources used for downlink data transmission and those used for downlink physical layer signaling transmission are insufficient, the base station 201 determines that the configuration mode is the third mode; or when the received full-duplex capability support information indicates that the small cell 202 supports use of the same physical layer resource for simultaneous reception on the backhaul link and transmission on the access link, but the first event transmitted by the small cell 202 is not received, the base station 201 determines that the configuration mode is the first mode; or when the received full-duplex capability support information indicates that the small cell 202 does not support use of the same physical layer resource for simultaneous reception on the backhaul link and transmission on the access link, the base station 201 determines that the configuration mode is the first mode.

An optional implementation solution of the example 3 is shown in Table 3:

TABLE 3

| Full-duplex capability support information | Whether the first event transmitted by the small cell 202 is received | Physical layer resources used for downlink data transmission on the backhaul link | Physical layer resources used for downlink physical layer signaling transmission on the backhaul link | Configuration mode |
|---|---|---|---|---|
| Yes | Yes | Insufficient | Sufficient | Second mode |
| Yes | Yes | Insufficient | Insufficient | Third mode |
| Yes | No | — | — | First mode |
| No | — | — | — | First mode |

Example 4

In the example 4, the base station 201 determines the configuration mode according to the factor 1 and the factor 4.

When the received full-duplex capability support information indicates that the small cell 202 supports use of the same physical layer resource for simultaneous reception on the backhaul link and transmission on the access link, and one or more of the following conditions are met, the base station 201 determines that the configuration mode is the second mode or the third mode:

condition 1: the quantity of the wireless terminals that currently communicate with the small cell 202 is greater than a preset "threshold for a quantity of wireless terminals that are performing communication";

condition 2: the data volume of the downlink data buffered by the small cell 202 is greater than a preset "threshold for a data volume of buffered downlink data";

condition 3: a QCI fed back by a wireless terminal that currently communicates with the small cell 202 is higher than a preset "QCI threshold";

condition 4: the power value of the access link that the small cell 202 needs to reduce if the mode is switched to the second mode is less than a preset "threshold for power reduction in the second mode";

condition 5: the power value of the access link that the small cell 202 needs to reduce if the mode is switched to the third mode is less than a preset "threshold for power reduction in the third mode";

condition 6: the quantity of the wireless terminals that need to be handed over to other cells among the wireless terminals that currently communicate with the small cell 202 if the mode is switched to the second mode is less than a preset "threshold for a quantity of terminals to be handed over in the second mode";

condition 7: the quantity of the wireless terminals that need to be handed over to other cells among the wireless terminals that currently communicate with the small cell 202 if the mode is switched to the third mode is less than a preset "threshold for a quantity of terminals to be handed over in the third mode";

condition 8: a downlink coverage radius of the small cell 202 is greater than a preset "threshold for a downlink coverage radius of the small cell"; or condition 9: the downlink transmit power value of the small cell 202 is greater than a preset "threshold for a downlink transmit power of the small cell".

For example, when the full-duplex capability support information received by the base station 201 indicates that the small cell 202 supports use of the same physical layer resource for simultaneous reception on the backhaul link and transmission on the access link, and one or more of the foregoing conditions are met, if on the backhaul link between the base station 201 and the small cell 202, physical layer resources used for downlink physical layer signaling transmission are sufficient, the base station 201 may determine that the configuration mode is the second mode; or if on the backhaul link between the base station 201 and the small cell 202, physical layer resources used for downlink physical layer signaling transmission are insufficient, the base station 201 may determine that the configuration mode is the third mode.

The foregoing describes optional implementation solutions to determining the configuration mode by the base station 201. The following describes an optional manner of controlling the small cell 202 to switch between the configuration modes by the base station 201.

Example 5

In the example 5, assuming that the wireless communications system 20 is an LTE system, the solution to implementing the subframe configuration information is described.

In the example 5, the base station is an eNodeB, and the small cell is a relay node (Relay). For brief description, a relay that "supports use of a same physical layer resource for simultaneous reception on a backhaul link and transmission on an access link" is referred to as a full-duplex (Full Duplex, FD) Relay (FD Relay).

The first downlink physical channel is an R-PDCCH and/or an E-PDCCH, and the second downlink physical channel is a PDCCH;

the first mode is: the relay receives, by using the R-PDCCH and/or the E-PDCCH on the backhaul link, the physical layer signaling transmitted by the eNodeB, and a subframe on the access link of the relay is a multicast broadcast single frequency network (Multicast Broadcast Single Frequency Network, MBSFN) subframe;

the second mode is: the relay receives, by using the PDCCH on the backhaul link, the physical layer signaling transmitted by the eNodeB, and the subframe on the access link of the relay is a normal subframe, namely, an uplink subframe or a downlink subframe, not including a special subframe; and the third mode is: the relay receives, by using the R-PD-CCH and/or the E-PDCCH, and the PDCCH on the backhaul link, the physical layer signaling transmitted by the eNodeB, and the subframe on the access link of the relay is a normal subframe.

Optionally, if the configuration mode determined by the eNodeB is the first mode, the subframe configuration information is used to indicate:

in a downlink subframe on the backhaul link between the eNodeB and the relay, first three OFDM symbols and a last OFDM symbol are vacant, some physical resource blocks (Physical Resource Block, PRB) of one or more OFDM symbols in a fourth OFDM symbol to a thirteenth OFDM symbol are used for physical layer signaling transmission, for example, configured as the R-PDCCH or the E-PDCCH, and other PRBs may be used for data transmission, for example, configured as the PDSCH; and in a downlink subframe on the access link of the relay, first two OFDM symbols may be used for physical layer signaling transmission, for example, configured as the PDCCH, a third OFDM symbol and a last OFDM symbol are used as transmission gaps (Transmission gap), and other OFDM symbols are vacant.

Figure 4A:
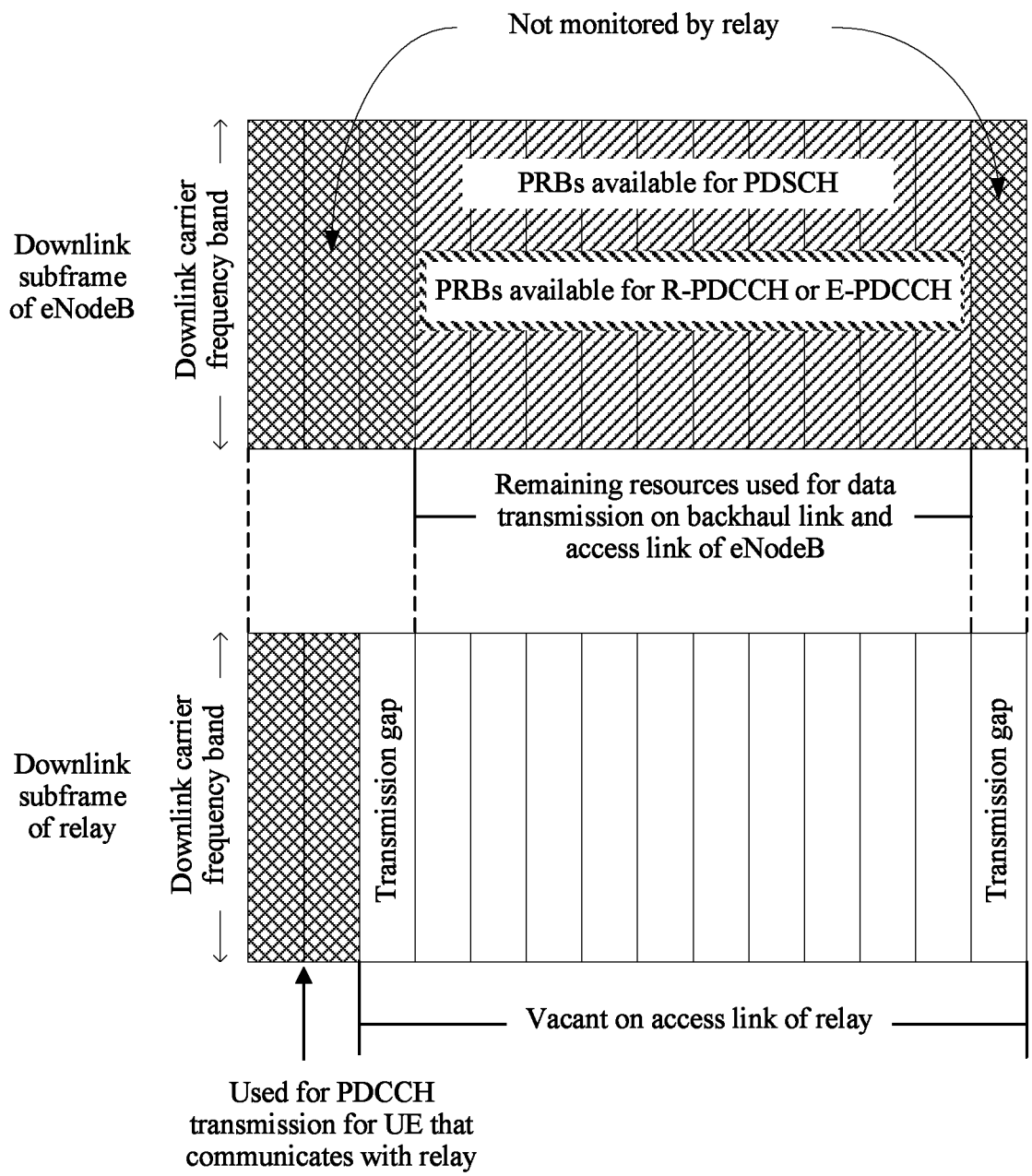
FIG. 4A is a schematic diagram of a subframe configuration solution in a first mode according to an embodiment of the present invention.

A subframe configuration solution in the first mode may be shown in FIG. 4A.

If the configuration mode determined by the eNodeB is the second mode, the subframe configuration information is used to indicate:

in a downlink subframe on the backhaul link between the eNodeB and the relay, first three OFDM symbols may be used for physical layer signaling transmission, for example, configured as the PDCCH, and other OFDM symbols may be used for data transmission, for example, configured as the PDSCH; and in a downlink subframe on the access link of the relay, first three OFDM symbols may be used for physical layer signaling transmission, for example, configured as the PDCCH, and other OFDM symbols may be used for data transmission, for example, configured as the PDSCH.

Figure 4B:
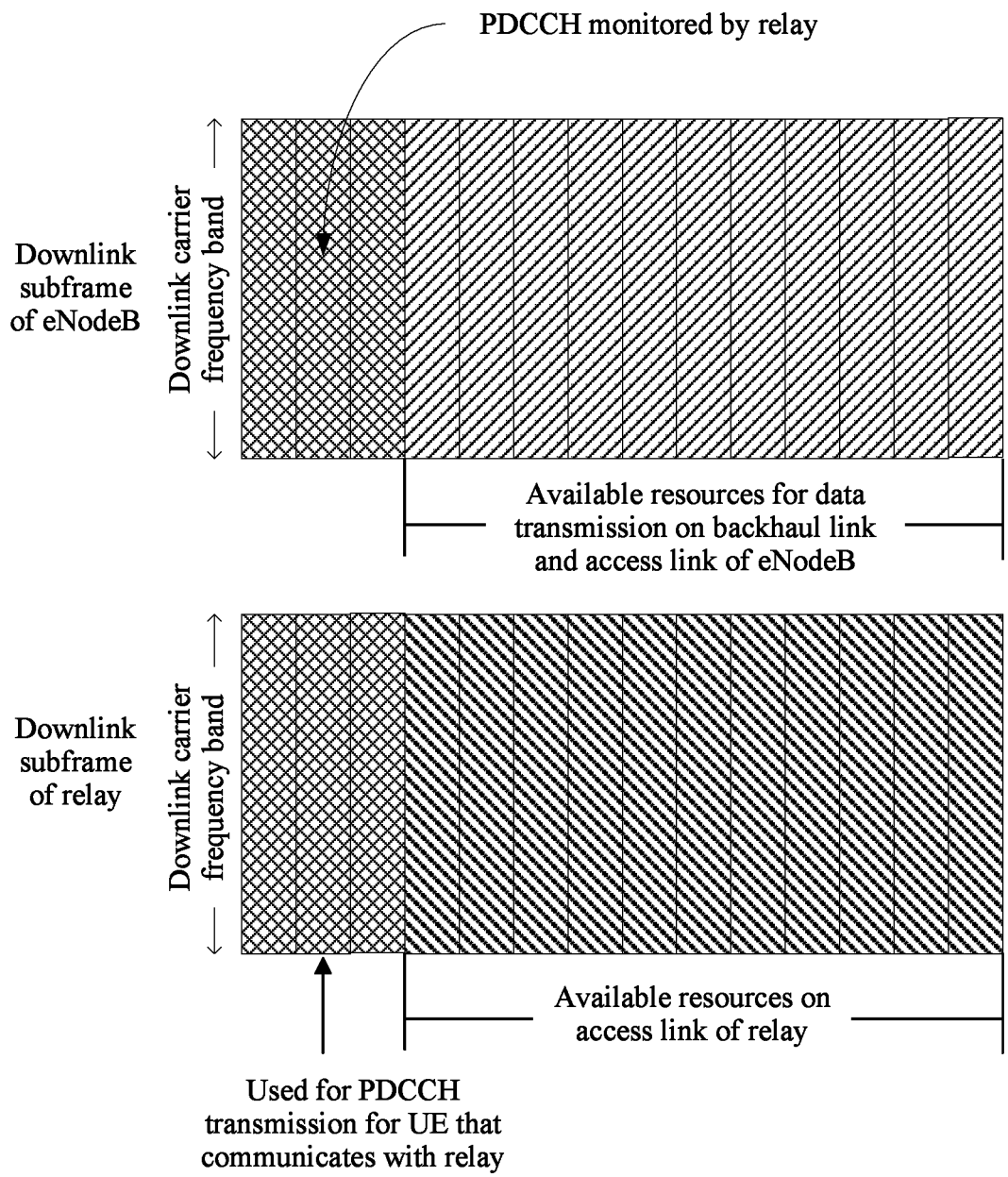
FIG. 4B is a schematic diagram of a subframe configuration solution in a second mode according to an embodiment of the present invention.

A subframe configuration solution in the second mode may be shown in FIG. 4B.

If the configuration mode determined by the eNodeB is the third mode, the subframe configuration information is used to indicate:

in a downlink subframe on the backhaul link between the eNodeB and the relay, first three OFDM symbols may be used for physical layer signaling transmission, for example, configured as the PDCCH, and other OFDM symbols are used for data transmission and physical layer signaling transmission, for example, some physical layer resources are configured as the PDSCH, and other physical layer resources are configured as the E-PDCCH or the R-PDCCH; and in a downlink subframe on the access link of the relay, first three OFDM symbols may be used for physical layer signaling transmission, for example, configured as the PDCCH, and other OFDM symbols may be used for data transmission, for example, configured as the PDSCH.

Figure 4C:
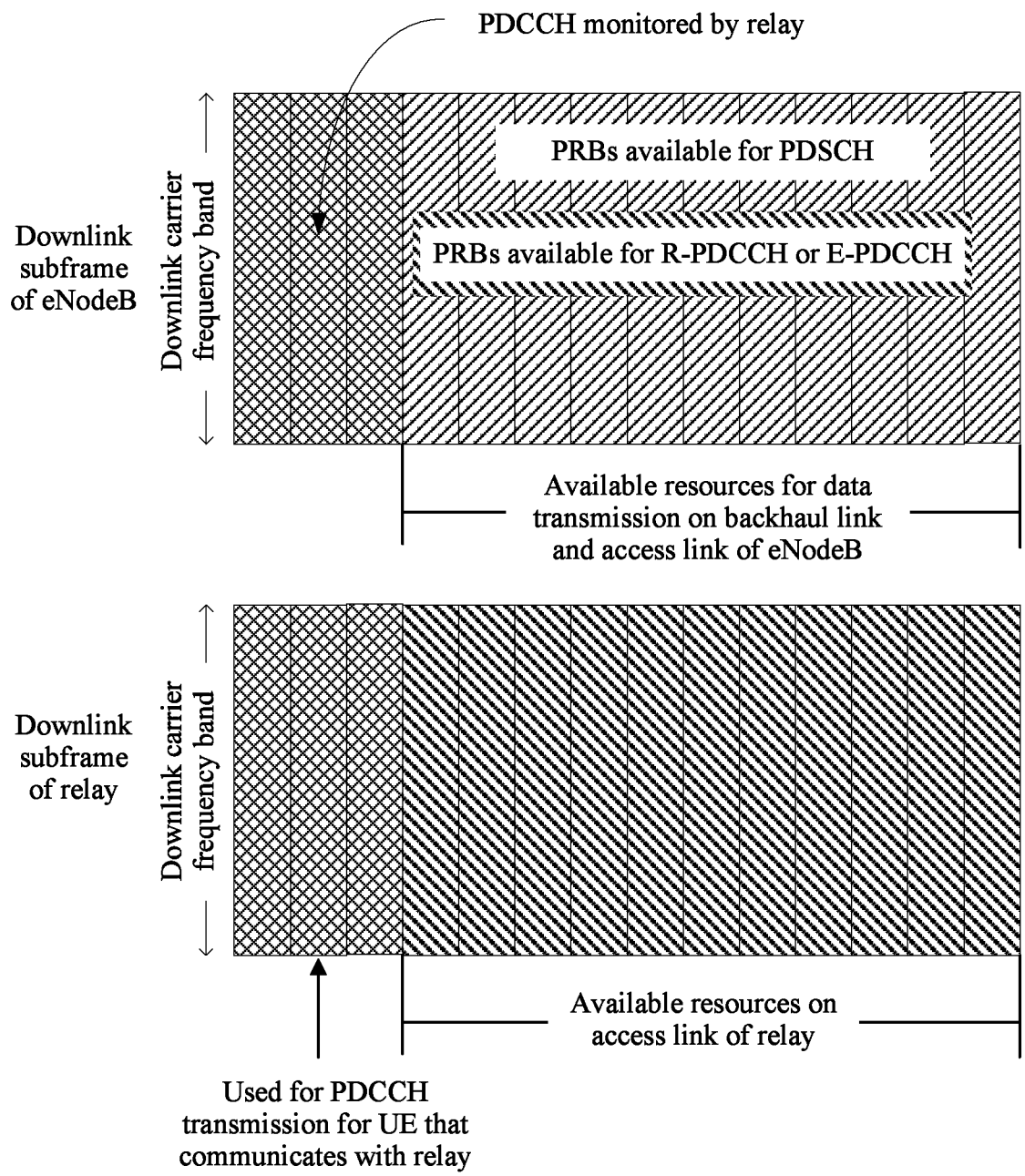
FIG. 4C is a schematic diagram of a subframe configuration solution in a third mode according to an embodiment of the present invention.

A subframe configuration solution in the third mode may be shown in FIG. 4C.

Figure 5:
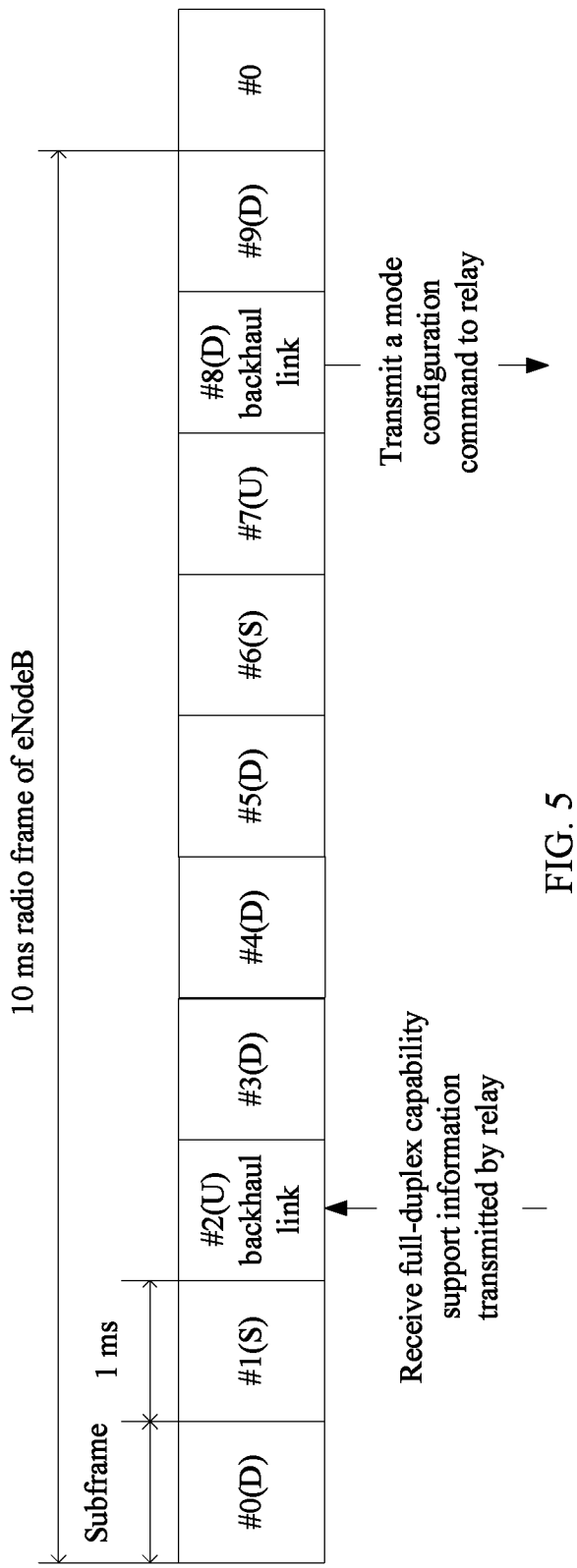
FIG. 5 is a schematic diagram of a manner of configuring a small cell mode by a base station according to an embodiment of the present invention.

As shown in FIG. 5, the eNodeB may receive, in a subframe #2 of a 10 ms radio frame, the full-duplex capability support information transmitted by the relay. In FIG. 5, "U" indicates an uplink subframe, "D" indicates a downlink subframe, and "S" indicates a special subframe. The mode configuration command is transmitted in a subframe #8 to the relay.

Figure 6A:
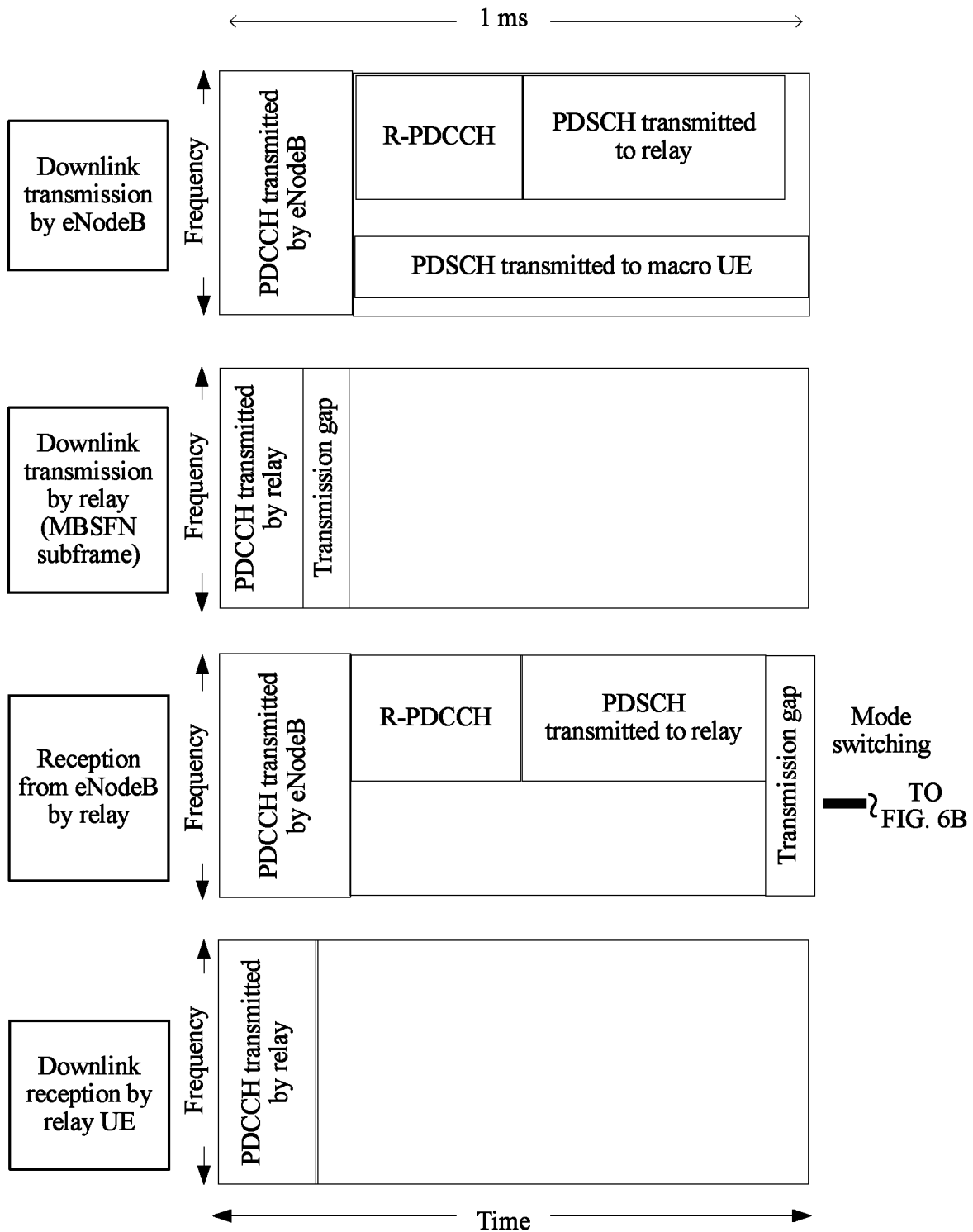
FIG. 6A and FIG. 6B are a schematic diagram of subframe configurations when a small cell switches from a first mode to a second mode according to an embodiment of the present invention.
Figure 6B:
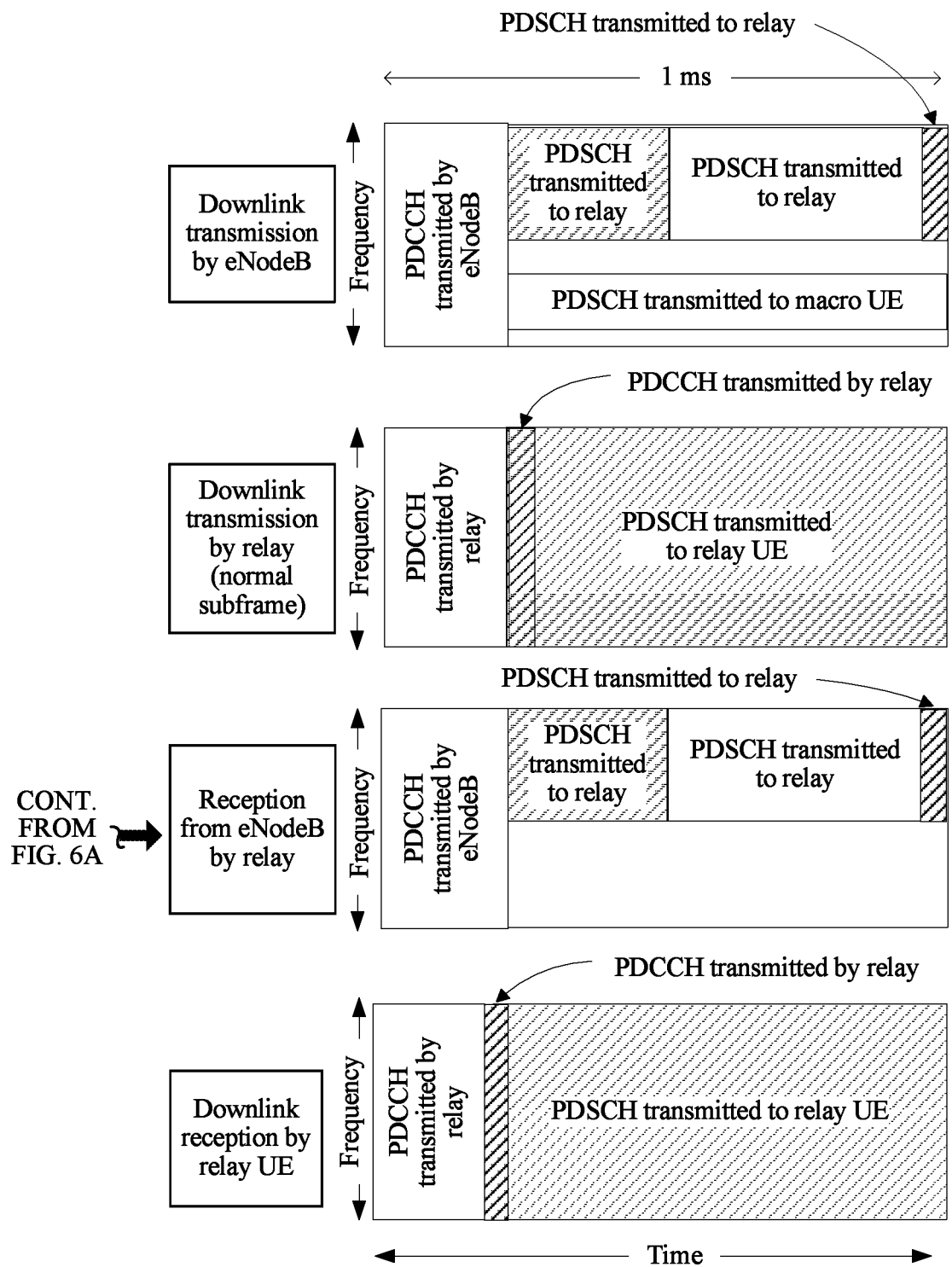

FIG. 6A and FIG. 6B show subframe configurations on the backhaul link and the access link when the mode is switched from the first mode to the second mode. A left part is a subframe configuration in the first mode, a right part is a subframe configuration in the second mode, and a part with slashes is used to indicate available physical layer resources added by mode switching. As can be seen from FIG. 6A and FIG. 6B, when the relay is an FD relay, switching the subframe configuration mode to the second mode may increase the physical layer resources used for data transmission and physical layer signaling transmission. Therefore, utilization of system resources is improved, and resource waste is avoided.

Based on a same inventive concept, the embodiments of the present invention further provide a base station, a small cell, and a control channel configuration method. Because principles for resolving problems by the base station, the small cell, and the control channel configuration method are the same as the wireless communications system provided by the embodiments of the present invention, for implementations thereof, refer to the implementation of the system. No repetition is provided herein.

Figure 7:
FIG. 7 is a first schematic structural diagram of a base station according to an embodiment of the present invention.

FIG. 7 is a first schematic structural diagram of a base station according to an embodiment of the present invention. As shown in FIG. 7, the base station includes:

a transceiver module 701, configured to receive full-duplex capability support information transmitted by a small cell that communicates with the base station, where the full-duplex capability support information is used to indicate whether the small cell supports use of a same physical layer resource for simultaneous reception on a backhaul link and transmission on an access link; and a processing module 702, configured to determine a configuration mode of the backhaul link between the base station and the small cell and the access link of the small cell according to the full-duplex capability support information received by the transceiver module 701, where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

Optionally, the processing module 702 is specifically configured to:

determine the configuration mode of the backhaul link between the base station and the small cell and the access link of the small cell according to the full-duplex capability support information received by the transceiver module 701 and at least one of the following factors:

usage of physical layer resources on the backhaul link between the base station and the small cell, detected by the processing module 702;

whether the transceiver module 701 receives a first event transmitted by the small cell, where the first event is used to indicate that a self-interference cancellation gain of the small cell is greater than a preset self-interference cancellation gain threshold; or usage information of the small cell.

Optionally, the processing module 702 is specifically configured to:

when the full-duplex capability support information received by the transceiver module 701 indicates that the small cell supports use of the same physical layer resource for simultaneous reception on the backhaul link and transmission on the access link, and the processing module 702 detects that on the backhaul link between the base station and the small cell, physical layer resources used for downlink data transmission are insufficient, determine that the configuration mode is the second mode or the third mode.

Optionally, the processing module 702 is specifically configured to:

when the full-duplex capability support information received by the transceiver module 701 indicates that the small cell supports use of the same physical layer resource for simultaneous reception on the backhaul link and transmission on the access link, and the processing module 702 detects that on the backhaul link between the base station and the small cell, the physical layer resources used for downlink data transmission are insufficient, but detects that on the backhaul link between the base station and the small cell, physical layer resources used for downlink physical layer signaling transmission are sufficient, determine that the configuration mode is the second mode; or when the full-duplex capability support information received by the transceiver module 701 indicates that the small cell supports use of the same physical layer resource for simultaneous reception on the backhaul link and transmission on the access link, and the processing module 702 detects that on the backhaul link between the base station and the small cell, both the physical layer resources used for downlink data transmission and those used for downlink physical layer signaling transmission are insufficient, determine that the configuration mode is the third mode.

Optionally, the processing module 702 is specifically configured to:

when the full-duplex capability support information received by the transceiver module 701 indicates that the small cell supports use of the same physical layer resource for simultaneous reception on the backhaul link and transmission on the access link, and the first event transmitted by the small cell is received, determine that the configuration mode is the second mode or the third mode.

Optionally, the processing module 702 is specifically configured to:

when the full-duplex capability support information received by the transceiver module 701 indicates that the small cell supports use of the same physical layer resource for simultaneous reception on the backhaul link and transmission on the access link, and the first event transmitted by the small cell is received, and the processing module 702 detects that on the backhaul link between the base station and the small cell, physical layer resources of a downlink physical channel used for downlink physical layer signaling transmission are sufficient, determine that the configuration mode is the second mode; or when the full-duplex capability support information received by the receiving module indicates that the small cell supports use of the same physical layer resource for simultaneous reception on the backhaul link and transmission on the access link, and the first event transmitted by the small cell is received, and the processing module 702 detects that on the backhaul link between the base station and the small cell, physical layer resources used for downlink physical layer signaling transmission are insufficient, determine that the configuration mode is the third mode.

Optionally, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

Optionally, the processing module 702 is specifically configured to:

when the full-duplex capability support information received by the transceiver module 701 indicates that the small cell does not support use of the same physical layer resource for simultaneous reception on the backhaul link and transmission on the access link, determine that the configuration mode is the first mode.

Optionally, the processing module 702 is further configured to:

after determining, according to the full-duplex capability support information received by the transceiver module 701, the configuration mode of the backhaul link between the base station and the small cell and the access link of the small cell, transmit a mode configuration command to the small cell by using the transceiver module 701, where the mode configuration command is used to configure the configuration mode of the backhaul link between the base station and the small cell and the access link of the small cell as the determined configuration mode.

Optionally, the mode configuration command is transmitted by using a radio resource control RRC message, medium access control MAC signaling, or downlink physical layer signaling.

Optionally, the mode configuration command further includes subframe configuration information of the backhaul link between the base station and the small cell and the access link of the small cell; or the mode configuration command is further used to instruct the small cell to use preset subframe configuration information as subframe configuration information of the backhaul link between the base station and the small cell and the access link of the small cell.

Optionally, a wireless communications system in which the small cell and the base station are located is a Long Term Evolution LTE system;

the first downlink physical channel is a relay-physical downlink control channel R-PDCCH and/or an enhanced physical downlink control channel E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

Optionally, if the configuration mode determined by the processing module 702 is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

Optionally, if the configuration mode determined by the processing module 702 is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

Optionally, if the configuration mode determined by the base station is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

Optionally, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes.

Optionally, the processing module 702 is specifically configured to:

periodically determine the configuration mode of the backhaul link between the base station and the small cell and the access link of the small cell; or when a waiting delay of data transmitted by the transceiver module 701 to the small cell is greater than a preset waiting delay threshold, determine the configuration mode of the backhaul link between the base station and the small cell and the access link of the small cell.

Optionally, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

For other optional implementations of the base station, refer to the foregoing base station 201. No repetition is provided herein.

Figure 8:
FIG. 8 is a second schematic structural diagram of a base station according to an embodiment of the present invention.

FIG. 8 is a second schematic structural diagram of a base station according to an embodiment of the present invention. As shown in FIG. 8, the base station includes:

a transceiver 801, configured to receive full-duplex capability support information transmitted by a small cell that communicates with the base station, where the full-duplex capability support information is used to indicate whether the small cell supports use of a same physical layer resource for simultaneous reception on a backhaul link and transmission on an access link; and a processor 802, configured to determine a configuration mode of the backhaul link between the base station and the small cell and the access link of the small cell according to the full-duplex capability support information received by the transceiver 801, where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

For other optional implementations of the transceiver 801, refer to the foregoing transceiver module 701. For other optional implementations of the processor 802, refer to the foregoing processing module 702. For other optional implementations of the base station, refer to the foregoing base station 201. No repetition is provided herein.

Figure 9:
FIG. 9 is a first schematic structural diagram of a small cell according to an embodiment of the present invention.

FIG. 9 is a first schematic structural diagram of a small cell according to an embodiment of the present invention. As shown in FIG. 9, the small cell includes:

a processing module 901, configured to determine full-duplex capability support information of the small cell, where the full-duplex capability support information is used to indicate whether the small cell supports use of a same physical layer resource for simultaneous reception on a backhaul link and transmission on an access link; and a transceiver module 902, configured to transmit the determined full-duplex capability support information to a base station to instruct the base station to determine a configuration mode of the backhaul link between the base station and the small cell and the access link of the small cell according to the full-duplex capability support information; where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

Optionally, the transceiver module 902 is further configured to: after transmitting the determined full-duplex capability support information to the base station, receive a mode configuration command transmitted by the base station, where the mode configuration command is used to indicate the configuration mode of the backhaul link between the base station and the small cell and the access link of the small cell; and the processing module 901 is further configured to configure the configuration mode of the backhaul link between the base station and the small cell and the access link of the small cell according to the mode configuration command received by the transceiver module 902.

Optionally, before receiving the mode configuration command transmitted by the base station, the transceiver module 902 is further configured to:

when a self-interference cancellation gain of the small cell is greater than a preset self-interference cancellation gain threshold, transmit a first event to the base station, and/or transmit usage information of the small cell to the base station, to instruct the base station to determine the configuration mode of the backhaul link between the base station and the small cell and the access link of the small cell according to the full-duplex capability support information and at least one of the following factors:

whether the base station receives the first event; or the usage information of the small cell.

Optionally, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

Optionally, the mode configuration command is transmitted by using a radio resource control RRC message, medium access control MAC signaling, or downlink physical layer signaling.

Optionally, the mode configuration command further includes subframe configuration information of the backhaul link between the base station and the small cell and the access link of the small cell; and the processing module 901 is further configured to configure a subframe of the small cell according to the subframe configuration information in the mode configuration command after the transceiver module 902 receives the mode configuration command transmitted by the base station; or the mode configuration command is further used to instruct the small cell to use preset subframe configuration information as subframe configuration information of the backhaul link between the base station and the small cell and the access link of the small cell; and the processing module 901 is further configured to configure a subframe of the small cell according to the preset subframe configuration information after the transceiver module 902 receives the mode configuration command transmitted by the base station.

Optionally, after the processing module 901 configures the subframe of the small cell according to the subframe configuration information, the transceiver module 902 is further configured to:

transmit, by using an RRC message, MAC signaling, or a physical downlink control channel, the subframe configuration information of the access link of the small cell to a wireless terminal that communicates with the small cell.

Optionally, a wireless communications system in which the small cell and the base station are located is a Long Term Evolution LTE system;

the first downlink physical channel is a relay-physical downlink control channel R-PDCCH and/or an E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

Optionally, if the configuration mode determined by the base station is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

Optionally, if the configuration mode determined by the base station is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

Optionally, if the configuration mode determined by the base station is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

Optionally, the processing module 901 is specifically configured to:

after a preset configuration delay threshold elapses after the transceiver module 902 receives the mode configuration command, configure a configuration mode of a physical control channel on the backhaul link between the base station and the small cell.

Optionally, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes; and the processing module 901 is specifically configured to:

configure the configuration mode of the one or more subframes on the backhaul link between the base station and the small cell and the access link of the small cell according to the mode configuration command.

Optionally, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

For other optional implementations of the small cell, refer to the foregoing small cell 202. No repetition is provided herein.

Figure 10:
FIG. 10 is a second schematic structural diagram of a small cell according to an embodiment of the present invention.

FIG. 10 is a second schematic structural diagram of a small cell according to an embodiment of the present invention. As shown in FIG. 10, the small cell includes:

a processor 1001, configured to determine full-duplex capability support information of the small cell, where the full-duplex capability support information is used to indicate whether the small cell supports use of a same physical layer resource for simultaneous reception on a backhaul link and transmission on an access link; and a transceiver 1002, configured to transmit the determined full-duplex capability support information to a base station to instruct the base station to determine a configuration mode of the backhaul link between the base station and the small cell and the access link of the small cell according to the full-duplex capability support information; where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

For implementations of the processor 1001, refer to the foregoing processing module 901. For implementations of the transceiver 1002, refer to the foregoing transceiver 902. For other optional implementations of the small cell, refer to the foregoing small cell 202. No repetition is provided herein.

Figure 11:
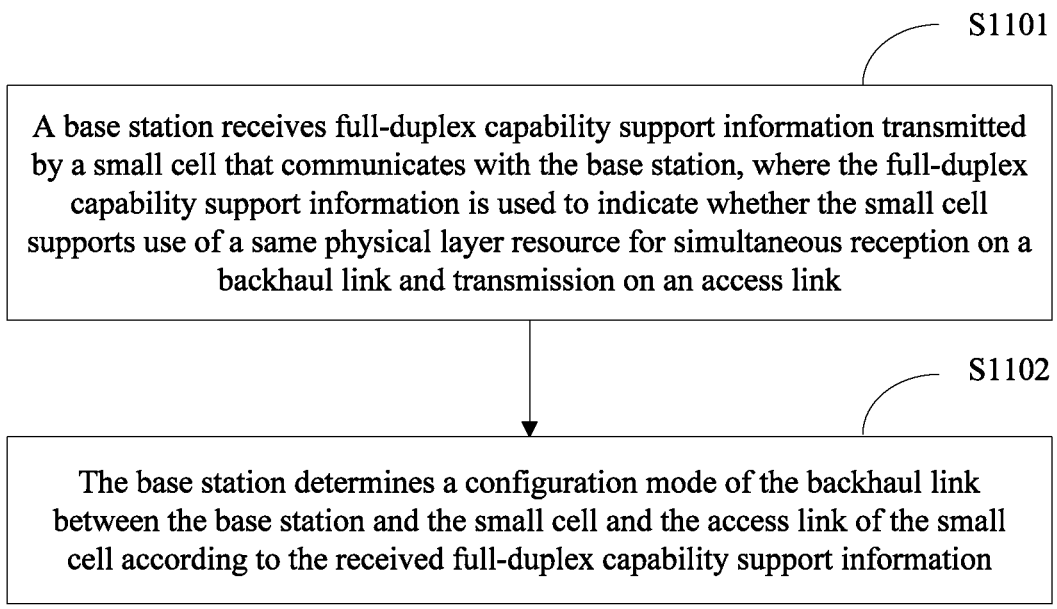
FIG. 11 is a first flowchart of a control channel configuration method according to an embodiment of the present invention.

FIG. 11 is a first flowchart of a control channel configuration method according to an embodiment of the present invention. As shown in FIG. 11, the method includes the following steps.

S1101. A base station receives full-duplex capability support information transmitted by a small cell that communicates with the base station, where the full-duplex capability support information is used to indicate whether the small cell supports use of a same physical layer resource for simultaneous reception on a backhaul link and transmission on an access link.

S1102. The base station determines a configuration mode of the backhaul link between the base station and the small cell and the access link of the small cell according to the received full-duplex capability support information, where the configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

Optionally, step S1102 in which the base station determines the configuration mode of the backhaul link between the base station and the small cell and the access link of the small cell according to the received full-duplex capability support information includes:

the base station determines the configuration mode of the backhaul link between the base station and the small cell and the access link of the small cell according to the received full-duplex capability support information and at least one of the following factors:

usage of physical layer resources on the backhaul link between the base station and the small cell, detected by the base station;

whether the base station receives a first event transmitted by the small cell, where the first event is used to indicate that a self-interference cancellation gain of the small cell is greater than a preset self-interference cancellation gain threshold; or usage information of the small cell.

Optionally, step S1102 in which the base station determines the configuration mode of the backhaul link between the base station and the small cell and the access link of the small cell according to the received full-duplex capability support information includes:

when the received full-duplex capability support information indicates that the small cell supports use of the same physical layer resource for simultaneous reception on the backhaul link and transmission on the access link, and it is detected that on the backhaul link between the base station and the small cell, physical layer resources used for downlink data transmission are insufficient, the base station determines that the configuration mode is the second mode or the third mode.

Optionally, step S1102 in which the base station determines the configuration mode of the backhaul link between the base station and the small cell and the access link of the small cell according to the received full-duplex capability support information includes:

when the received full-duplex capability support information indicates that the small cell supports use of the same physical layer resource for simultaneous reception on the backhaul link and transmission on the access link, and it is detected that on the backhaul link between the base station and the small cell, the physical layer resources used for downlink data transmission are insufficient, but it is detected that on the backhaul link between the base station and the small cell, physical layer resources used for downlink physical layer signaling transmission are sufficient, the base station determines that the configuration mode is the second mode; or when the received full-duplex capability support information indicates that the small cell supports use of the same physical layer resource for simultaneous reception on the backhaul link and transmission on the access link, and it is detected that on the backhaul link between the base station and the small cell, both the physical layer resources used for downlink data transmission and those used for downlink physical layer signaling transmission are insufficient, the base station determines that the configuration mode is the third mode.

Optionally, step S1102 in which the base station determines the configuration mode of the backhaul link between the base station and the small cell and the access link of the small cell according to the received full-duplex capability support information includes:

when the received full-duplex capability support information indicates that the small cell supports use of the same physical layer resource for simultaneous reception on the backhaul link and transmission on the access link, and the first event transmitted by the small cell is received, the base station determines that the configuration mode is the second mode or the third mode.

Optionally, step S1102 in which the base station determines a configuration mode of a physical control channel on the backhaul link between the base station and the small cell according to the received full-duplex capability support information includes:

when the received full-duplex capability support information indicates that the small cell supports use of the same physical layer resource for simultaneous reception on the backhaul link and transmission on the access link, and the first event transmitted by the small cell is received, and it is detected that on the backhaul link between the base station and the small cell, physical layer resources of a downlink physical channel used for downlink physical layer signaling transmission are sufficient, the base station determines that the configuration mode is the second mode; or when the received full-duplex capability support information indicates that the small cell supports use of the same physical layer resource for simultaneous reception on the backhaul link and transmission on the access link, and the first event transmitted by the small cell is received, and it is detected that on the backhaul link between the base station and the small cell, physical layer resources used for downlink physical layer signaling transmission are insufficient, the base station determines that the configuration mode is the third mode.

Optionally, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

Optionally, step S1102 in which the base station determines the configuration mode of the backhaul link between the base station and the small cell and the access link of the small cell according to the received full-duplex capability support information includes:

when the received full-duplex capability support information indicates that the small cell does not support use of the same physical layer resource for simultaneous reception on the backhaul link and transmission on the access link, the base station determines that the configuration mode is the first mode.

Optionally, after step S1102 in which the base station determines the configuration mode of the backhaul link between the base station and the small cell and the access link of the small cell according to the received full-duplex capability support information, the method further includes:

the base station transmits a mode configuration command to the small cell, where the mode configuration command is used to configure the configuration mode of the backhaul link between the base station and the small cell and the access link of the small cell as the determined configuration mode.

Optionally, the mode configuration command is transmitted by using a radio resource control RRC message, medium access control MAC signaling, or downlink physical layer signaling.

Optionally, the mode configuration command further includes subframe configuration information of the backhaul link between the base station and the small cell and the access link of the small cell; or the mode configuration command is further used to instruct the small cell to use preset subframe configuration information as subframe configuration information of the backhaul link between the base station and the small cell and the access link of the small cell.

Optionally, a wireless communications system in which the small cell and the base station are located is a Long Term Evolution LTE system;

the first downlink physical channel is a relay-physical downlink control channel R-PDCCH and/or an enhanced physical downlink control channel E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

Optionally, if the configuration mode determined by the base station in step S1102 is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

Optionally, if the configuration mode determined by the base station in step S1102 is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

Optionally, if the configuration mode determined by the base station in step S1102 is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

Optionally, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes.

Optionally, step S1102 in which the base station determines the configuration mode of the backhaul link between the base station and the small cell and the access link of the small cell according to the received full-duplex capability support information includes:

the base station periodically determines the configuration mode of the backhaul link between the base station and the small cell and the access link of the small cell; or when a waiting delay of data transmitted to the small cell is greater than a preset waiting delay threshold, the base station determines the configuration mode of the backhaul link between the base station and the small cell and the access link of the small cell.

Optionally, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

For other optional implementations of the method, refer to the processing by the foregoing base station 201. No repetition is provided herein.

Figure 12:
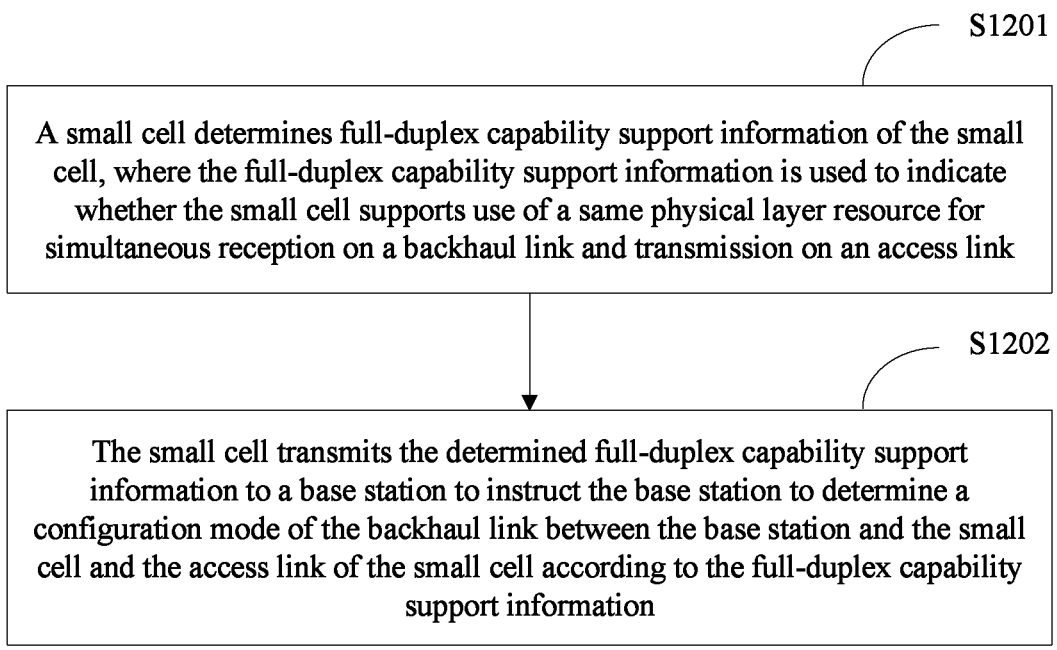
FIG. 12 is a second flowchart of a control channel configuration method according to an embodiment of the present invention.

FIG. 12 is a second flowchart of a control channel configuration method according to an embodiment of the present invention. As shown in FIG. 12, the method includes the following steps.

S1201. A small cell determines full-duplex capability support information of the small cell, where the full-duplex capability support information is used to indicate whether the small cell supports use of a same physical layer resource for simultaneous reception on a backhaul link and transmission on an access link.

S1202. The small cell transmits the determined full-duplex capability support information to a base station to instruct the base station to determine a configuration mode of the backhaul link between the base station and the small cell and the access link of the small cell according to the full-duplex capability support information.

The configuration mode is one of the following modes:

a first mode: the small cell receives, by using a first downlink physical channel on the backhaul link, physical layer signaling transmitted by the base station, and other physical layer resources on the access link of the small cell different from a physical layer resource occupied by the backhaul link of the small cell may be used for downlink transmission by the small cell;

a second mode: the small cell receives, by using a second downlink physical channel on the backhaul link, physical layer signaling transmitted by the base station, and all physical layer resources on the access link of the small cell may be used for downlink transmission by the small cell; or a third mode: the small cell receives, by using a first downlink physical channel and a second downlink physical channel on the backhaul link, physical layer signaling transmitted by the base station, and all physical layer resources on the access link of the small cell may be used for downlink transmission by the small cell; where the first downlink physical channel is used for physical layer signaling transmission on the backhaul link between the base station and the small cell, and occupies a physical layer resource of a downlink physical channel used for data transmission between the base station and the small cell; and the second downlink physical channel is a conventional downlink physical channel used for physical layer signaling transmission between the base station and a wireless terminal.

Optionally, after step S1202 in which the small cell transmits the determined full-duplex capability support information to the base station, the method further includes:

the small cell receives a mode configuration command transmitted by the base station, where the mode configuration command is used to indicate the configuration mode of the backhaul link between the base station and the small cell and the access link of the small cell; and the small cell configures the configuration mode of the backhaul link between the base station and the small cell and the access link of the small cell according to the mode configuration command.

Optionally, before the small cell receives the mode configuration command transmitted by the base station, the method further includes:

when a self-interference cancellation gain of the small cell is greater than a preset self-interference cancellation gain threshold, the small cell transmits a first event to the base station, and/or the small cell transmits usage information of the small cell to the base station, to instruct the base station to determine the configuration mode of the backhaul link between the base station and the small cell and the access link of the small cell according to the full-duplex capability support information and at least one of the following factors:

whether the base station receives the first event; or the usage information of the small cell.

Optionally, the usage information of the small cell includes one or more items in the following information:

a quantity of wireless terminals that currently communicate with the small cell;

a data volume of downlink data buffered by the small cell;

information about a to-be-reached communication quality indicator fed back by a wireless terminal that currently communicates with the small cell;

a power value of the access link that the small cell needs to reduce if the mode is switched to the second mode;

a power value of the access link that the small cell needs to reduce if the mode is switched to the third mode;

a quantity of wireless terminals that need to be handed over to other cells among wireless terminals that currently communicate with the small cell if the mode is switched to the second mode;

a quantity of wireless terminals that need to be handed over to other cells among wireless terminals that currently communicate with the small cell if the mode is switched to the third mode;

downlink coverage information of the small cell; or a downlink transmit power value of the small cell.

Optionally, the mode configuration command is transmitted by using a radio resource control RRC message, medium access control MAC signaling, or downlink physical layer signaling.

Optionally, the mode configuration command further includes subframe configuration information of the backhaul link between the base station and the small cell and the access link of the small cell; and after the small cell receives the mode configuration command transmitted by the base station, the method further includes: the small cell configures a subframe of the small cell according to the subframe configuration information in the mode configuration command; or the mode configuration command is further used to instruct the small cell to use preset subframe configuration information as subframe configuration information of the backhaul link between the base station and the small cell and the access link of the small cell; and after the small cell receives the mode configuration command transmitted by the base station, the method further includes: the small cell configures a subframe of the small cell according to the preset subframe configuration information.

Optionally, after the small cell configures the subframe of the small cell according to the subframe configuration information, the method further includes:

the small cell transmits, by using an RRC message, MAC signaling, or a physical downlink control channel, the subframe configuration information of the access link of the small cell to a wireless terminal that communicates with the small cell.

Optionally, a wireless communications system in which the small cell and the base station are located is a Long Term Evolution LTE system;

the first downlink physical channel is a relay-physical downlink control channel R-PDCCH and/or an E-PDCCH;

the second downlink physical channel is a physical downlink control channel PDCCH;

the first mode is: the small cell receives, by using the R-PDCCH and/or the E-PDCCH on the backhaul link, the physical layer signaling transmitted by the base station, and a subframe on the access link of the small cell is a multicast broadcast single frequency network MBSFN subframe;

the second mode is: the small cell receives, by using the PDCCH on the backhaul link, the physical layer signaling transmitted by the base station, and the subframe on the access link of the small cell is a normal subframe; and the third mode is: the small cell receives, by using the R-PDCCH and/or the E-PDCCH, and the PDCCH on the backhaul link, the physical layer signaling transmitted by the base station, and the subframe on the access link of the small cell is a normal subframe.

Optionally, if the configuration mode determined by the base station is the first mode, the subframe configuration information is used to indicate:

in a downlink subframe on the backhaul link between the base station and the small cell, first three orthogonal frequency division multiplexing OFDM symbols and a last OFDM symbol are vacant, some physical resource blocks PRBs of one or more OFDM symbols in a fourth OFDM symbol to a thirteenth OFDM symbol are used for physical layer signaling transmission, and other PRBs may be used for data transmission; and in a downlink subframe on the access link of the small cell, first two OFDM symbols may be used for physical layer signaling transmission, a third OFDM symbol and a last OFDM symbol are used as transmission gaps, and other OFDM symbols are vacant.

Optionally, if the configuration mode determined by the base station is the second mode, the subframe configuration information is used to indicate:

in a downlink subframe on the backhaul link between the base station and the small cell, first three OFDM symbols may be used for physical layer signaling transmission, and other OFDM symbols may be used for data transmission; and in a downlink subframe on the access link of the small cell, first three OFDM symbols may be used for physical layer signaling transmission, and other OFDM symbols may be used for data transmission.

Optionally, if the configuration mode determined by the base station is the third mode, the subframe configuration information is used to indicate:

in a downlink subframe on the backhaul link between the base station and the small cell, first three OFDM symbols may be used for physical layer signaling transmission, and other OFDM symbols are used for data transmission and physical layer signaling transmission; and in a downlink subframe on the access link of the small cell, first three OFDM symbols may be used for physical layer signaling transmission, and other OFDM symbols may be used for data transmission.

Optionally, that the small cell configures a configuration mode of a physical control channel on the backhaul link between the base station and the small cell according to the mode configuration command includes:

after a preset configuration delay threshold elapses after the mode configuration command is received, the small cell configures the configuration mode of the physical control channel on the backhaul link between the base station and the small cell.

Optionally, the configuration mode is intended for one or more subframes of the small cell; and the mode configuration command includes identifier information of the one or more subframes; or the one or more subframes are specified in advance, and the mode configuration command includes activation information for activating or deactivating the configuration mode used for the one or more subframes; and that the small cell configures the configuration mode of the backhaul link between the base station and the small cell and the access link of the small cell according to the mode configuration command includes:

the small cell configures the configuration mode of the one or more subframes on the backhaul link between the base station and the small cell and the access link of the small cell according to the mode configuration command.

Optionally, switching from the first mode to the second mode or the third mode is semi-static, and switching between the second mode and the third mode is dynamic, where the semi-static indicates that a period of switching between the configuration modes is not less than a length of a radio frame; and the dynamic indicates that the period of switching between the configuration modes is less than the length of the radio frame.

In conclusion, in this embodiment of the present invention, the small cell transmits the full-duplex capability support information of the small cell to the base station, where the full-duplex capability support information is used to indicate whether the small cell supports use of the same physical layer resource for simultaneous reception on the backhaul link and transmission on the access link; and the base station determines the configuration mode of the backhaul link between the base station and the small cell and the access link of the small cell according to the received full-duplex capability support information, where the configuration mode is one of the first mode, the second mode, or the third mode.

In the second mode, the small cell receives, by using the second downlink physical channel on the backhaul link, the physical layer signaling transmitted by the base station, but the second downlink physical channel is a conventional downlink physical channel used for physical layer signaling transmission between the base station and a wireless terminal and does not need to occupy any physical layer resource of a downlink physical channel used for data transmission between the base station and the small cell. Therefore, physical resources of the downlink physical channel used for data transmission on the backhaul link are saved, data transmission efficiency is improved, and a problem of resource waste is avoided. In addition, because the second mode is determined according to the full-duplex capability support information of the small cell, the full-duplex capability of the small cell is considered, and therefore, communication quality is also ensured.

In the third mode, the small cell receives, by using the first downlink physical channel and the second downlink physical channel on the backhaul link, the physical layer signaling transmitted by the base station, and all the physical layer resources on the access link of the small cell may be used for downlink transmission by the small cell. This also implements full-duplex transmission by the small cell, and also considers that physical layer resources used for physical layer signaling transmission on the backhaul link may be insufficient. Therefore, the small cell receives, by using the first downlink physical channel and the second downlink physical channel, the physical layer signaling transmitted by the base station, and this alleviates the problem that the physical layer resources used for physical layer signaling transmission are insufficient. In addition, similar to the second mode, because the second downlink physical channel does not need to occupy any physical layer resource of the downlink physical channel used for data transmission between the base station and the small cell, the physical resources of the downlink physical channel used for data transmission on the backhaul link are saved, data transmission efficiency is improved, and the problem of resource waste is avoided. In addition, because the second mode is determined according to the full-duplex capability support information of the small cell, the full-duplex capability of the small cell is considered, and therefore, communication quality is also ensured.

In addition, considering that the small cell may not support use of the same physical layer resource for simultaneous reception on the backhaul link and transmission on the access link, the first mode is further configured. This avoids possible interference caused when the small cell uses the same physical layer resource for simultaneous reception on the backhaul link and transmission on the access link if the small cell does not support use of the same physical layer resource for simultaneous reception on the backhaul link and transmission on the access link.

Therefore, in this embodiment of the present invention, according to whether the small cell supports use of the same physical layer resource for simultaneous reception on the backhaul link and transmission on the access link, an appropriate configuration mode is determined comprehensively. Therefore, not only communication quality is ensured, but also resource waste can be avoided.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A control channel configuration method in a Long Term Evolution (LTE) system in which a small cell and a base station are located, comprising:
    receiving, by the base station, full-duplex capability support information transmitted by the small cell that communicates with the base station for indicating whether the small cell supports use of a same physical layer resource for simultaneous reception on a backhaul link and transmission on an access link;
    determining, by the base station, a configuration mode of the backhaul link between the base station and the small cell and the access link of the small cell according to the received full-duplex capability support information,
    transmitting, by the base station, a mode configuration command to the small cell for configuring the configuration mode of the backhaul link between the base station and the small cell and the access link of the small cell as the determined configuration mode;
    wherein:
        the mode configuration command further comprises subframe configuration information of the backhaul link between the base station and the small cell and the access link of the small cell; or
        the mode configuration command is further used for instructing the small cell to use preset subframe configuration information as the subframe configuration information of the backhaul link between the base station and the small cell and the access link of the small cell;
    wherein the configuration mode is one of the following modes:
        a first mode is: the small cell receives, using at least one of a relay-physical downlink control channel (R-PDCCH) or an enhanced physical downlink control channel (E-PDCCH) on the backhaul link, the physical layer signaling transmitted by the base station, and other physical layer resources on the access link of the small cell different from a physical layer resource occupied by the backhaul link of the small cell are used for downlink transmission by the small cell, and a subframe on the access link of the small cell is a multicast broadcast single frequency network (MBSFN) subframe;
        a second mode is: the small cell receives, using a physical downlink control channel (PDCCH) on the backhaul link, the physical layer signaling transmitted by the base station, and all physical layer resources on the access link of the small cell are used for downlink transmission by the small cell, and the subframe on the access link of the small cell is a normal subframe; and
        a third mode is: the small cell receives, using at least one of the R-PDCCH or the E-PDCCH, and the PDCCH on the backhaul link, the physical layer signaling transmitted by the base station, and all physical layer resources on the access link of the small cell are used for downlink transmission by the small cell, and the subframe on the access link of the small cell is a normal subframe,
    wherein the at least one of the R-PDCCH or the E-PDCCH is used for physical layer signaling transmission on the backhaul link between the base station and the small cell, and occupies a physical layer resource of a downlink physical channel used for data transmission between the base station and the small cell; and wherein the PDCCH is used for physical layer signaling transmission between the base station and a wireless terminal.

2. The method according to claim 1, wherein when the configuration mode determined by the base station is the first mode, the subframe configuration information is used for indicating:
    in a downlink subframe on the backhaul link between the base station and the small cell, a first three orthogonal frequency division multiplexing (OFDM) symbols and a last OFDM symbol are vacant, some physical resource blocks (PRBs) of one or more OFDM symbols in a fourth OFDM symbol to a thirteenth OFDM symbol are used for physical layer signaling transmission, and other PRBs are used for data transmission; and
    in a downlink subframe on the access link of the small cell, a first two OFDM symbols are used for physical layer signaling transmission, a third OFDM symbol and a last OFDM symbol are used as transmission gaps, and other OFDM symbols are vacant.

3. The method according to claim 1, wherein when the configuration mode determined by the base station is the second mode, the subframe configuration information is used for indicating:
    in a downlink subframe on the backhaul link between the base station and the small cell, a first three orthogonal frequency division multiplexing (OFDM) symbols are used for physical layer signaling transmission, and other OFDM symbols are used for data transmission; and
    in a downlink subframe on the access link of the small cell, a first three OFDM symbols are used for physical layer signaling transmission, and other OFDM symbols are used for data transmission.

4. The method according to claim 1, wherein when the configuration mode determined by the base station is the third mode, the subframe configuration information is used for indicating:
    in a downlink subframe on the backhaul link between the base station and the small cell, a first three orthogonal frequency division multiplexing (OFDM) symbols are used for physical layer signaling transmission, and other OFDM symbols are used for data transmission and physical layer signaling transmission; and
    in a downlink subframe on the access link of the small cell, a first three OFDM symbols are used for physical layer signaling transmission, and other OFDM symbols are used for data transmission.

5. A control channel configuration method in a Long Term Evolution (LTE) system in which a small cell and a base station are located, comprising:
- determining, by the small cell, full-duplex capability support information of the small cell for indicating whether the small cell supports use of a same physical layer resource for simultaneous reception on a backhaul link and transmission on an access link;
- transmitting, by the small cell, the determined full-duplex capability support information to the base station for instructing the base station to determine a configuration mode of the backhaul link between the base station and the small cell and the access link of the small cell according to the full-duplex capability support information,
- receiving, by the small cell, a mode configuration command transmitted by the base station for indicating the configuration mode of the backhaul link between the base station and the small cell and the access link of the small cell; wherein the mode configuration command is transmitted using a radio resource control (RRC) message, medium access control (MAC) signaling, or downlink physical layer signaling;
- configuring, by the small cell, the configuration mode of the backhaul link between the base station and the small cell and the access link of the small cell according to the mode configuration command;
- wherein the mode configuration command further comprises subframe configuration information of the backhaul link between the base station and the small cell and the access link of the small cell; and after receiving, by the small cell, the mode configuration command transmitted by the base station, the method further comprises:
  - configuring, by the small cell, a subframe of the small cell according to the subframe configuration information in the mode configuration command; or
- wherein the mode configuration command is further used to instruct the small cell to use preset subframe configuration information as the subframe configuration information of the backhaul link between the base station and the small cell and the access link of the small cell; and after receiving, by the small cell, the mode configuration command transmitted by the base station, the method further comprises:
  - configuring, by the small cell, a subframe of the small cell according to the preset subframe configuration information;
- wherein the configuration mode is one of the following modes:
  - a first mode is: the small cell receives, using at least one of a relay-physical downlink control channel (R-PDCCH) or an enhanced physical downlink control channel (E-PDCCH) on the backhaul link, the physical layer signaling transmitted by the base station, and other physical layer resources on the access link of the small cell different from a physical layer resource occupied by the backhaul link of the small cell are used for downlink transmission by the small cell, and the subframe on the access link of the small cell is a multicast broadcast single frequency network (MBSFN) subframe;
  - a second mode is: the small cell receives, using a physical downlink control channel (PDCCH) on the backhaul link, the physical layer signaling transmitted by the base station, and all physical layer resources on the access link of the small cell are used for downlink transmission by the small cell, and the subframe on the access link of the small cell is a normal subframe; and
  - a third mode is: the small cell receives, using at least one of the R-PDCCH or the E-PDCCH, and the PDCCH on the backhaul link, the physical layer signaling transmitted by the base station, and all physical layer resources on the access link of the small cell are used for downlink transmission by the small cell, and the subframe on the access link of the small cell is a normal subframe,
- wherein the at least one of the R-PDCCH or the E-PDCCH is used for physical layer signaling transmission on the backhaul link between the base station and the small cell, and occupies a physical layer resource of a downlink physical channel used for data transmission between the base station and the small cell; and
- wherein the PDCCH is used for physical layer signaling transmission between the base station and a wireless terminal.

6. The method according to claim 5, wherein when the configuration mode determined by the base station is the first mode, the subframe configuration information is used for indicating:
- in a downlink subframe on the backhaul link between the base station and the small cell, a first three orthogonal frequency division multiplexing (OFDM) symbols and a last OFDM symbol are vacant, some physical resource blocks (PRBs) of one or more OFDM symbols in a fourth OFDM symbol to a thirteenth OFDM symbol are used for physical layer signaling transmission, and other PRBs are used for data transmission; and
- in a downlink subframe on the access link of the small cell, a first two OFDM symbols are used for physical layer signaling transmission, a third OFDM symbol and a last OFDM symbol are used as transmission gaps, and other OFDM symbols are vacant.

7. The method according to claim 5, wherein when the configuration mode determined by the base station is the second mode, the subframe configuration information is used for indicating:
- in a downlink subframe on the backhaul link between the base station and the small cell, a first three orthogonal frequency division multiplexing (OFDM) symbols are used for physical layer signaling transmission, and other OFDM symbols are used for data transmission; and
- in a downlink subframe on the access link of the small cell, a first three OFDM symbols are used for physical layer signaling transmission, and other OFDM symbols are used for data transmission.

8. The method according to claim 5, wherein when the configuration mode determined by the base station is the third mode, the subframe configuration information is used for indicating:
- in a downlink subframe on the backhaul link between the base station and the small cell, a first three orthogonal frequency division multiplexing (OFDM) symbols are used for physical layer signaling transmission, and other OFDM symbols are used for data transmission and physical layer signaling transmission; and
- in a downlink subframe on the access link of the small cell, a first three OFDM symbols are used for physical layer signaling transmission, and other OFDM symbols may be used for data transmission.

* * * * *